United States Patent
Zhang et al.

(10) Patent No.: US 11,582,804 B2
(45) Date of Patent: Feb. 14, 2023

(54) RACH PROCEDURES IN NEW RADIO-UNLICENSED (NR-U)

(71) Applicant: QUALCOMM INCORPORATED, San Diego, CA (US)

(72) Inventors: Xiaoxia Zhang, San Diego, CA (US); Srinivas Yerramalli, San Diego, CA (US); Ozcan Ozturk, San Diego, CA (US); Linhai He, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 16/670,892

(22) Filed: Oct. 31, 2019

(65) Prior Publication Data

US 2020/0154488 A1 May 14, 2020

Related U.S. Application Data

(60) Provisional application No. 62/758,112, filed on Nov. 9, 2018.

(51) Int. Cl.
*H04W 74/08* (2009.01)
*H04W 68/00* (2009.01)
(Continued)

(52) U.S. Cl.
CPC ....... *H04W 74/0833* (2013.01); *H04W 24/08* (2013.01); *H04W 68/005* (2013.01);
(Continued)

(58) Field of Classification Search
CPC ............. H04W 74/0833; H04W 24/08; H04W 68/005; H04W 72/14; H04W 74/006;
(Continued)

(56) References Cited

U.S. PATENT DOCUMENTS

2012/0082107 A1* 4/2012 Ou ................... H04W 74/0833
   370/329
2013/0258882 A1* 10/2013 Dinan ................ H04W 52/242
   370/336
(Continued)

FOREIGN PATENT DOCUMENTS

EP      3609284 A1 *  2/2020  ........... H04B 17/318
WO  WO-2021035559 A1 *  3/2021  ........ H04W 28/0289

OTHER PUBLICATIONS

Huawei, et al., "Timers and Counters for Two-steps RACH", 3GPP Draft, 3GPP TSG•RAN WG2 Meeting #104, R2-1816604, Timers and Counters for Two-step RACH Revised, 3rd Generation Partnership Project (3GPP), Mobile Competence Centre, 650, Route Des Lucioles, F-06921, Sophia-Antipolis Cedex, France, vol. RAN WG2, No. Spokane, US; Nov. 12, 2018-Nov. 16, 2018, Nov. 2, 2018, (Nov. 2, 2018), XP051480550, 74 pages, Retrieved from the Internet: URL: http://www.3gpp.org/ftp/tsg%5Fran/WG2%5FRL2/TSGR2%5F104/Docs/R2%2D1816604%2Ezip [retrieved on Nov. 2, 2018] section "2 Counters for two-step RACH", section "2 Timers for two-step RACH"; Proposals 1, 1bis, 2, 3, e.g.: "Proposal 2: One Transmission Counter is Needed for Two-step RACH. The Transmission Counter will be Incremented by One Regardless the Result of LBT," e.g.: "Proposal 3: an MsgB Timer is Needed for Two-steps RACH. The UE shall Monitor the PDCCH for MsgB when the MsgB Timer is Running.".

(Continued)

*Primary Examiner* — Ayaz R Sheikh
*Assistant Examiner* — Louis Samara
(74) *Attorney, Agent, or Firm* — Haynes and Boone, LLP

(57) ABSTRACT

Systems and methods related to UL communications in a wireless network are provided. A UE receives an indication of a plurality of TXOPs for a RACH procedure from a BS. In an embodiment, the UE starts a timer after either successfully transmitting a random access message to the BS or (Continued)

failing to succeed in any of the TXOPs. In another embodiment, the UE starts the timer at a pre-agreed time after one of the TXOPs, regardless of whether the random access message has been successfully transmitted yet or not. In another embodiment, the UE receives as part of a RACH response an indication of whether the RACH response is split into multiple parts. If the UE does not locate an identifier corresponding to the UE in the RACH response, the UE checks for the indication and, if present, listen for the next RACH response identified from the indication.

30 Claims, 10 Drawing Sheets

(51) Int. Cl.
    *H04W 24/08*     (2009.01)
    *H04W 72/14*     (2009.01)
    *H04W 74/00*     (2009.01)

(52) U.S. Cl.
    CPC ......... *H04W 72/14* (2013.01); *H04W 74/006* (2013.01); *H04W 74/0808* (2013.01)

(58) Field of Classification Search
    CPC ......... H04W 74/0808; H04W 72/0433; H04W 76/11; H04W 72/0406; H04B 7/0413; H04B 7/0695; H04L 27/261; H04L 1/0071; H04L 1/1812
    See application file for complete search history.

(56) References Cited

U.S. PATENT DOCUMENTS

| | | | |
|---|---|---|---|
| 2018/0139781 A1* | 5/2018 | Park | H04W 74/0808 |
| 2018/0242367 A1 | 8/2018 | Kim et al. | |
| 2019/0246420 A1* | 8/2019 | Park | H04W 72/087 |
| 2020/0008240 A1* | 1/2020 | Golitschek Edler von Elbwart | H04W 24/08 |
| 2020/0053779 A1* | 2/2020 | Jeon | H04B 7/0695 |
| 2020/0137806 A1* | 4/2020 | Islam | H04W 74/006 |
| 2020/0359392 A1* | 11/2020 | Zhu | H04B 7/0452 |
| 2021/0076429 A1* | 3/2021 | Pelletier | H04W 28/04 |

OTHER PUBLICATIONS

International Search Report and Written Opinion—PCT/US2019/059444—ISA/EPO—dated Feb. 2, 2020.

Mediatek Inc: "Further Considerations on 2-step RACH", 3GPP Draft, 3GPP TSG-RAN WG2 Meeting #103bis, R2-1813965 Further Considerations on 2-Step RACH, 3rd Generation Partnership Project (3GPP), Mobile Competence Centre, 650, Route Des Lucioles, F-06921 Sophia-Antipolis Cedex, France, vol. Ran WG2, No. Chengdu, China, Oct. 8, 2018-Oct. 12, 2018, Sep. 27, 2018 (Sep. 27, 2018), XP051523430, 7 Pages, Retrieved from the Internet: URL: http://www.3gpp.org/ftp/tsg%5Fran/WG2%5FRL2/TSGR2%5F103bis/Docs/R2%2D1813965%2Ezip [retrieved on Sep. 27, 2018], the whole document.

* cited by examiner

RACH PROCEDURES IN NEW RADIO-UNLICENSED (NR-U)

CROSS REFERENCE TO RELATED APPLICATIONS

The present application claims priority to and the benefit of the U.S. Provisional Patent Application No. 62/758,112, filed Nov. 9, 2018, which is hereby incorporated by reference in its entirety as if fully set forth below in its entirety and for all applicable purposes.

TECHNICAL FIELD

This application relates to wireless communication systems, and more particularly to uplink communications in a wireless network over spectrum shared by multiple network operating entities.

INTRODUCTION

To meet the growing demands for expanded mobile broadband connectivity, wireless communication technologies are advancing from long term evolution (LTE) technology to a next generation new radio (NR) technology. NR is designed to operate over a wide array of spectrum bands, as well as across different spectrum types, from licensed spectrum to unlicensed and shared spectrum. The operations or deployments of NR in an unlicensed spectrum is referred to as new radio-unlicensed (NR-U).

One approach to avoiding collisions when communicating in a shared spectrum or an unlicensed spectrum is to use a listen-before-talk (LBT) procedure to ensure that the shared channel is clear before transmitting a signal in the shared channel. In NR-U, a base station (BS) may schedule a user equipment (UE) for an uplink (UL) transmission over an unlicensed frequency band in a certain time period, and particularly multiple possible transmission opportunities in the time period. The UE may perform an LBT prior to each possible transmission opportunity in the scheduled time period until the UE is successful in transmitting a random access message.

One mechanism used to aid the random access process is a contention resolution timer at the UE. If, upon the UE transmitting the random access message to the BS, the UE does not receive a response (e.g., on the physical downlink shared control channel (PDCCH)) from the BS within the timer period, the UE will restart the random access process. Problems arise, however, when the UE receives multiple scheduled transmission opportunities within a time period. For example, the UE may fail to transmit the random access message during any of the transmission opportunities. In this situation, however, the timer does not start and so cannot expire and cause the UE to restart the random access process.

Another problem arises with enhanced RACH procedures that use two steps. As the payload size increases for the second message from the BS ("msgB"), such as from more UEs being serviced at a time, it becomes more likely for a given UE to fail to decode the msgB. This undesirably increases latency as it takes longer for the UE to restart the random access process.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communication device from a second wireless communication device, a plurality of transmit opportunities in a shared channel. The method further includes determining, by the first wireless communication device, whether the shared channel is in use prior to a transmit opportunity from among the plurality of transmit opportunities. The method further includes triggering, by the first wireless communication device, a timer in response to successfully transmitting a random access message during the transmit opportunity, or failing to successfully transmit the random access message during any of the plurality of transmit opportunities.

In an additional aspect of the disclosure, a method of wireless communication includes receiving, by a first wireless communication device from a second wireless communication device, a plurality of transmit opportunities in a shared channel. The method further includes determining, by the first wireless communication device, a designated time from among the plurality of transmit opportunities. The method further includes triggering, by the first wireless communication device, a timer in response reaching the determined designated time regardless of whether a random access message has been successfully transmitted during one of the plurality of transmit opportunities.

In an additional aspect of the disclosure, a method of wireless communication includes receiving, by a first wireless communication device from a second wireless communication device during a two-step random access procedure, a random access response in a shared channel during a random access window. The method further includes determining, by the first wireless communication device in response to the random access response not including an identifier of the first wireless communication device, whether the random access response includes an indication of a subsequent random access response pending from the second wireless communication device during the random access window. The method further includes monitoring, by the first wireless communication device, for the subsequent random access response from the second wireless communication device in the shared channel in response to determining that the random access response includes the indication during the random access window.

In an additional aspect of the disclosure, a method of wireless communication includes transmitting, by a first wireless communication device to a second wireless communication device, a plurality of transmit opportunities in a shared channel. The method further includes determining, by the first wireless communication device, a designated time from among the plurality of transmit opportunities. The method further includes triggering, by the first wireless communication device, a timer in response reaching the determined designated time regardless of whether a random access message has been successfully transmitted during one of the plurality of transmit opportunities.

In an additional aspect of the disclosure, a method of wireless communication includes determining, by a first wireless communication device, whether to transmit a plurality of random access responses during a two-step random access procedure in a shared channel during a random access window. The method further includes including, by the first wireless communication device in response to determining to transmit a plurality of random access responses, into a first random access response from the plurality of random access responses an indication of a second random access response from the plurality of random access responses. The method further includes transmitting, by the first wireless communication device to a second wireless communication device, the first random access response including the indication. The method further includes transmitting, by the first wireless communication device to the second wireless communication device, the second random access response after the first random access response.

In an additional aspect of the disclosure, an apparatus includes a transceiver configured to receive, from a wireless communication device, a plurality of transmit opportunities in a shared channel. The apparatus further includes a processor configured to determine whether the shared channel is in use prior to a transmit opportunity from among the plurality of transmit opportunities; and trigger a timer in response to successfully transmitting a random access message during the transmit opportunity, or failing to successfully transmit the random access message during any of the plurality of transmit opportunities.

In an additional aspect of the disclosure, an apparatus includes a transceiver configured to receive, from a wireless communication device, a plurality of transmit opportunities in a shared channel. The apparatus further includes a processor configured to determine a designated time from among the plurality of transmit opportunities; and trigger a timer in response to reaching the determined designated time regardless of whether a random access message has been successfully transmitted during one of the plurality of transmit opportunities.

In an additional aspect of the disclosure, an apparatus includes a transceiver configured to receive, from a wireless communication device during a two-step random access procedure, a random access response in a shared channel during a random access window. The apparatus further includes a processor configured to determine, in response to the random access response not including an identifier of the apparatus, whether the random access response includes an indication of a subsequent random access response pending from the wireless communication device during the random access window; and monitor for the subsequent random access response from the wireless communication device in the shared channel in response to determining that the random access response includes the indication during the random access window.

In an additional aspect of the disclosure, an apparatus includes a transceiver configured to transmit, to a wireless communication device, a plurality of transmit opportunities in a shared channel. The apparatus further includes a processor configured to determine a designated time from among the plurality of transmit opportunities; and trigger a timer in response reaching the determined designated time regardless of whether a random access message has been successfully transmitted during one of the plurality of transmit opportunities.

In an additional aspect of the disclosure, an apparatus includes a processor configured to determine whether to transmit a plurality of random access responses during a two-step random access procedure in a shared channel during a random access window. The processor is further configured to include, in response to determining to transmit a plurality of random access responses, into a first random access response from the plurality of random access responses an indication of a second random access response from the plurality of random access responses. The apparatus further includes a transceiver configured to transmit, to a second wireless communication device, the first random access response including the indication. The transceiver is further configured to transmit, to the second wireless communication device, the second random access response after the first random access response.

In an additional aspect of the disclosure, a non-transitory computer-readable medium is provided having program code recorded thereon, the program code comprising code for causing a first wireless communication device to receive, from a second wireless communication device, a plurality of transmit opportunities in a shared channel. The program code further comprises code for causing the first wireless communication device to determine whether the shared channel is in use prior to a transmit opportunity from among the plurality of transmit opportunities. The program code further comprises code for causing the first wireless communication device to trigger a timer in response to successfully transmitting a random access message during the transmit opportunity, or failing to successfully transmit the random access message during any of the plurality of transmit opportunities.

In an additional aspect of the disclosure, a non-transitory computer-readable medium is provided having program code recorded thereon, the program code comprising code for causing a first wireless communication device to receive, from a second wireless communication device, a plurality of transmit opportunities in a shared channel. The program code further comprises code for causing the first wireless communication device to determine a designated time from among the plurality of transmit opportunities. The program code further comprises code for causing the first wireless communication device to trigger a timer in response reaching the determined designated time regardless of whether a random access message has been successfully transmitted during one of the plurality of transmit opportunities.

In an additional aspect of the disclosure, a non-transitory computer-readable medium is provided having program code recorded thereon, the program code comprising code for causing a first wireless communication device to receive, from a second wireless communication device during a two-step random access procedure, a random access response in a shared channel during a random access window. The program code further comprises code for causing the first wireless communication device to determine, in response to the random access response not including an identifier of the first wireless communication device, whether the random access response includes an indication of a subsequent random access response pending from the second wireless communication device during the random access window. The program code further comprises code for causing the first wireless communication device to monitor for the subsequent random access response from the second wireless communication device in the shared channel in response to determining that the random access response includes the indication during the random access window.

In an additional aspect of the disclosure, a non-transitory computer-readable medium is provided having program code recorded thereon, the program code comprising code for causing a first wireless communication device to transmit, to a second wireless communication device, a plurality of transmit opportunities in a shared channel. The program code further comprises code for causing the first wireless communication device to determine a designated time from among the plurality of transmit opportunities. The program code further comprises code for causing the first wireless communication device to trigger a timer in response reaching the determined designated time regardless of whether a random access message has been successfully transmitted during one of the plurality of transmit opportunities.

In an additional aspect of the disclosure, a non-transitory computer-readable medium is provided having program code recorded thereon, the program code comprising code for causing a first wireless communication device to determine whether to transmit a plurality of random access responses during a two-step random access procedure in a shared channel during a random access window. The program code further comprises code for causing the first wireless communication device to include, in response to determining to transmit a plurality of random access responses, into a first random access response from the plurality of random access responses an indication of a second random access response from the plurality of random access responses. The program code further comprises code for causing the first wireless communication device to transmit, to a second wireless communication device, the first random access response including the indication. The program code further comprises code for causing the first wireless communication device to transmit, to the second wireless communication device, the second random access response after the first random access response.

In an additional aspect of the disclosure, an apparatus includes means receiving, from a wireless communication device, a plurality of transmit opportunities in a shared channel. The apparatus further includes means for determining whether the shared channel is in use prior to a transmit opportunity from among the plurality of transmit opportunities. The apparatus further includes means for triggering a timer in response to successfully transmitting a random access message during the transmit opportunity, or failing to successfully transmit the random access message during any of the plurality of transmit opportunities.

In an additional aspect of the disclosure, an apparatus includes means for receiving, from a wireless communication device, a plurality of transmit opportunities in a shared channel. The apparatus further includes means for determining a designated time from among the plurality of transmit opportunities. The apparatus further includes means for triggering a timer in response reaching the determined designated time regardless of whether a random access message has been successfully transmitted during one of the plurality of transmit opportunities.

In an additional aspect of the disclosure, an apparatus includes means for receiving, from a wireless communication device during a two-step random access procedure, a random access response in a shared channel during a random access window. The apparatus further includes means for determining, in response to the random access response not including an identifier of the apparatus, whether the random access response includes an indication of a subsequent random access response pending from the wireless communication device during the random access window. The apparatus further includes means for monitoring for the subsequent random access response from the wireless communication device in the shared channel in response to determining that the random access response includes the indication during the random access window.

In an additional aspect of the disclosure, an apparatus includes means for transmitting, to a wireless communication device, a plurality of transmit opportunities in a shared channel. The apparatus further includes means for determining a designated time from among the plurality of transmit opportunities. The apparatus further includes means for triggering a timer in response reaching the determined designated time regardless of whether a random access message has been successfully transmitted during one of the plurality of transmit opportunities.

In an additional aspect of the disclosure, an apparatus includes means for determining whether to transmit a plurality of random access responses during a two-step random access procedure in a shared channel during a random access window. The apparatus further includes means for including, in response to determining to transmit a plurality of random access responses, into a first random access response from the plurality of random access responses an indication of a second random access response from the plurality of random access responses. The apparatus further includes means for transmitting, to a wireless communication device, the first random access response including the indication. The apparatus further includes means for transmitting, to the wireless communication device, the second random access response after the first random access response.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
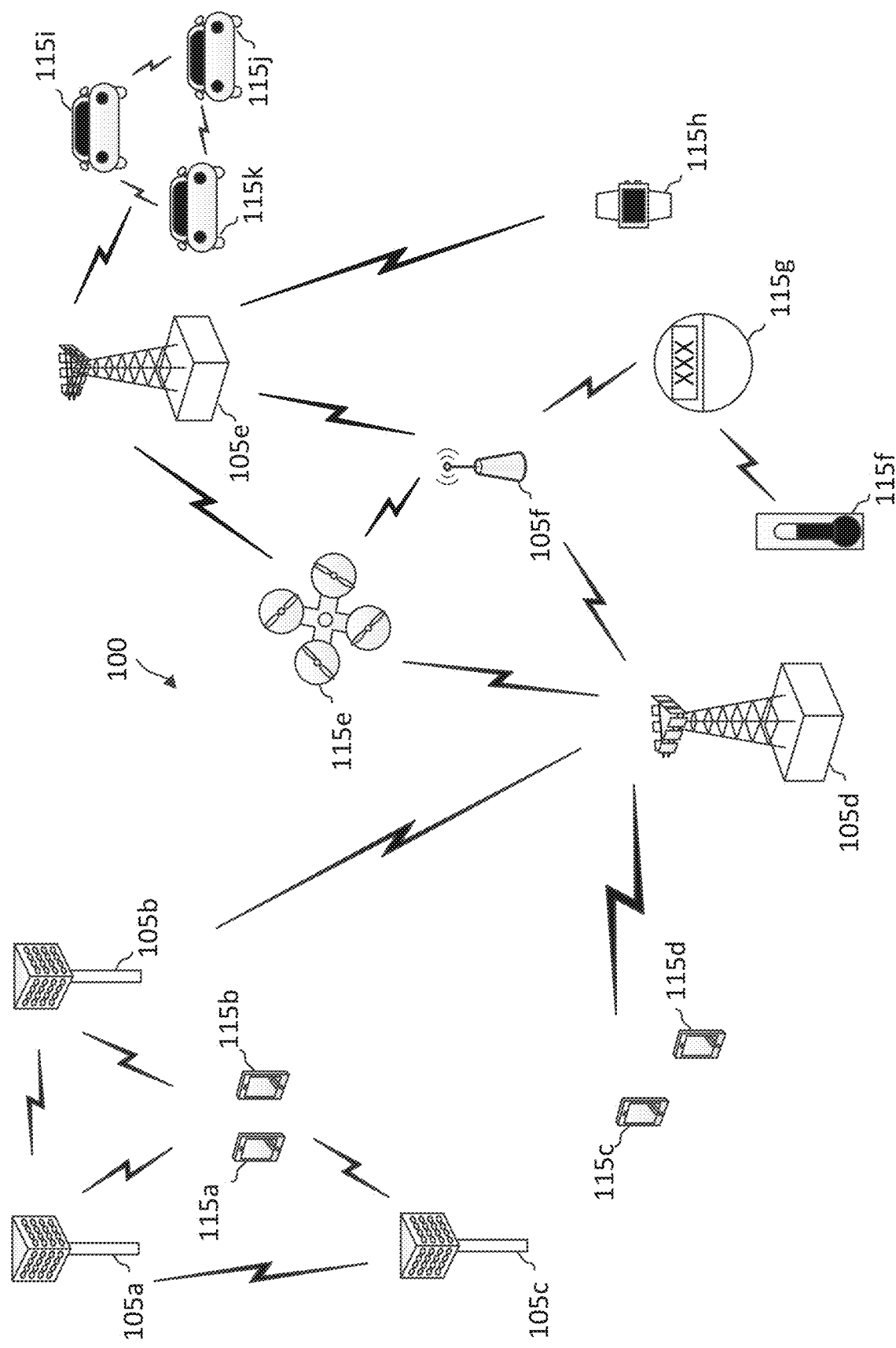
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, 3GPP is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to implement a contention resolution timer during a random access (RACH) procedure for UEs that are provided multiple RACH transmit opportunities in unlicensed spectrum. The present application further describes mechanisms to implement a two-step RACH procedure when the msgB may have a larger payload size that decreases the ability for given UEs to decode the message.

In an embodiment, a UE may receive an indication of a plurality of TXOPs for a RACH procedure (whether two-step or four-step) from a BS for use in an unlicensed frequency band. In some embodiments, the UE may start a contention resolution timer after either successfully transmitting a random access message to the BS or failing to succeed in any of the identified TXOPs in a given time period. In some other embodiments, the UE may start the contention resolution timer at a pre-agreed time after one of the identified TXOPs in the given time period—regardless of whether the random access message has been successfully transmitted yet or not.

In yet other embodiments of the present disclosure, the UE may further receive as part of a RACH response (in a two-step RACH procedure) an indication of the RACH response being split into multiple parts within the given time period where the BS has determined that the RACH response's payload is relatively large. The UE may use this indication in situations where the UE does not detect an identifier associated with the UE in the received RACH response to listen for the next, indicated RACH response.

Aspects of the present application provide several benefits. For example, where there are multiple TXOPs given to a UE, embodiments of the present disclosure facilitate triggering of a contention resolution timer even in scenarios where the UE fails to transmit the appropriate random access message, thus improving random access delay in NR-U. Further, embodiments of the present disclosure provide the benefit of assisting UEs with low SNR to have opportunity to decode a RACH response from a BS. This reduces delay in restarting the RACH procedure where appropriate.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or interne of everything (IoE) devices. The UEs 115$a$-115$d$ are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115$e$-115$k$ are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as small cell, the BS 105$f$. The macro BS 105$d$ may also transmits multicast services which are subscribed to and received by the UEs 115$c$ and 115$d$. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115$e$, which may be a drone. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105f, and the macro BS 105e, or in multi-hop configurations by communicating with another user device which relays its information to the network, such as the UE 115f communicating a temperature measurement information to the smart meter, the UE 115g, which is then reported to the network through the small cell BS 105f The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions may occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. An UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble (also referred to as a "message 1" or "msg1") and the BS 105 may respond with a random access response (also referred to as a "message 2" or "msg2"). Upon receiving the random access response, the UE 115 may transmit a connection request to the BS 105 (also referred to as a "message 3" or "msg3") and the BS 105 may respond with a connection response (e.g., contention resolution message) (also referred to as a "message 4" or "msg4"). This is also referred to as a four-step RACH (or random access) procedure. The random access procedure may alternatively be a two-step RACH (random access) procedure according to embodiments of the present disclosure. In a two-step RACH procedure, the UE 115 may transmit a "message A" or "msgA" (also at times referred to as an "enhanced message 1" or "eMSG1") which includes the msg1 and msg3 of the four-step RACH procedure. The BS 105 may respond with a "message B" or "msgB" (also at times referred to as an "enhanced message 2" or "eMSG2") which includes the msg2 and msg4 of the for-step RACH procedure.

Under either RACH procedure, after establishing a connection, the UE 115 and the BS 105 may enter a normal operation stage, where operational data may be exchanged.

For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel. As another example, a UE 115 may be informed of one or more TXOPs in the UL on one or more unlicensed frequency bands (e.g., from a BS 105). When the LBT passes for one of the one or more TXOPs, the UE 115 may send a message, such as part of a RACH procedure according to embodiments of the present disclosure.

For example, according to embodiments of the present disclosure, a UE 115 may receive an indication of a plurality of TXOPs for a RACH procedure (e.g., via RMSI or PDCCH order for a two-step RACH procedure or via msg2 for a four-step RACH procedure) from a BS 105 for use in an unlicensed frequency band. In some embodiments, the UE 115 may start a contention resolution timer after either successfully transmitting a random access message to the BS 105 or failing to succeed in any of the identified TXOPs in a given time period. In some other embodiments, the UE 115 may start the contention resolution timer at a pre-agreed time (e.g., agreed between the UE 115 and the BS 105) after one of the identified TXOPs in the given time period—regardless of whether the random access message has been successfully transmitted yet or not. In other embodiments of the present disclosure, the UE 115 may further receive as part of a msgB (in a two-step RACH procedure) an indication of the msgB being split into multiple parts within the given time period where the BS 105 has determined that the msgB's payload is relatively large. The UE 115 may use this indication in situations where the UE 115 does not detect an identifier associated with the UE 115 in the received msgB to listen for the next, indicated msgB to result in limiting power consumption at the UE 115 (e.g., from monitoring msgB until the end of the given time period (also referred to as a random access response window)).

Figure 2:
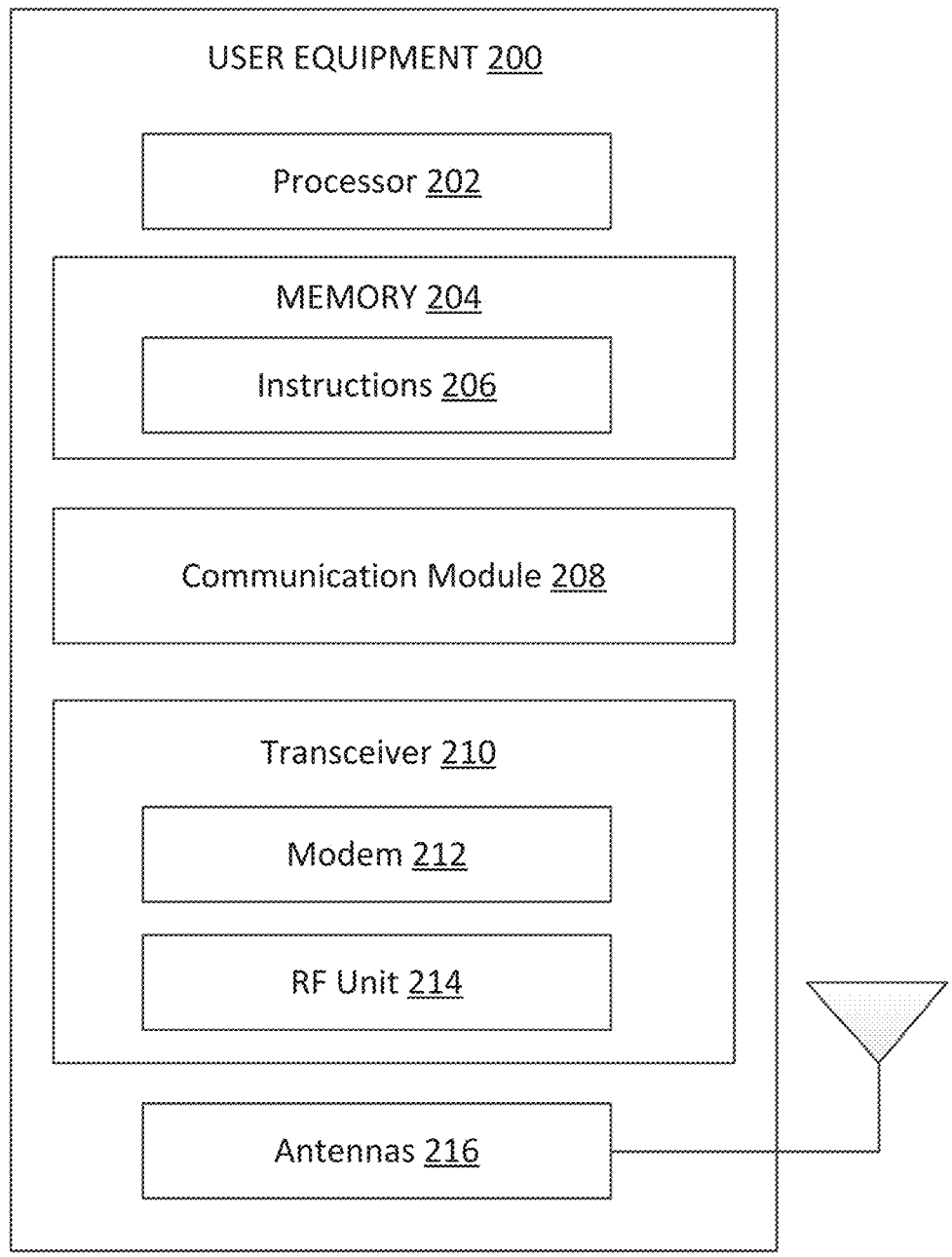
FIG. 2 is a block diagram of a user equipment (UE) according to some embodiments of the present disclosure.

FIG. 2 is a block diagram of an exemplary UE 200 according to embodiments of the present disclosure. The UE 200 may be a UE 115 in the network 100 as discussed above. As shown, the UE 200 may include a processor 202, a memory 204, a communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 208 may be implemented via hardware, software, or combination thereof. For example, the communication module 208 may be implemented as a processor, circuit, and/or instructions 206 stored in the memory 204 and executed by the processor 202. The communication module 208 may be used for various aspects of the present disclosure. For example, the communication module 208 is configured to receive from a BS (e.g., the BSs 105) reference signal configurations, scheduling grants, random access messaging, perform LBTs, communicate with the BS 105 based on the scheduling grants and the LBTs, and determine starting positions for UL data transmissions to the BS 105. For example, the random access messaging may include configuration information such as multiple random access TXOPs beginning at different starting positions within a random access period. The communication module 208 may be further configured to perform LBTs and transmit a random access preamble signal based on the identified random access TXOPs and the LBTs.

In an embodiment, the communication module 208 is configured to receive from a BS 105 one or more messages relating to a RACH procedure. For example, in a four-step RACH procedure, the communication module 208 is configured to receive msg2 from the BS 105 with the UL grant that includes multiple TXOPs. As another example, in a two-step RACH procedure, the communication module is configured to receive the UL grant with multiple TXOPs in RMSI or in a PDCCH order. As yet another example, in either the four-step or two-step RACH procedures, the communication module 208 of the UE 115 may receive an UL grant for multiple TXOPs on the PDCCH from the BS 105 (e.g., a HARQ message), for example in situations where the BS 105 is requesting a retransmission of one or more messages in a RACH procedure.

According to embodiments of the present disclosure, the communication module 208 is further configured to control a contention resolution timer used in a RACH procedure. For example, the contention resolution timer may be the timer broadcasted in a SIB message from the BS 105 at some prior time. In some embodiments, the communication module 208 is configured to start the contention resolution timer based upon either the success or failure of transmitting a random access message, such as msg3 (four-step RACH) or msgA (two-step RACH). For example, where the UE 115 has received multiple TXOPs from the BS 105, the communication module 208 is configured to start the contention resolution timer in response to successfully transmitting the random access message during one of the TXOPs. Further, should the UE 115 fail to successfully transmit the random access message during one of the identified TXOPs, then the communication module 208 is configured to start the contention resolution timer in response to failing after all of the identified TXOP in the time period.

In some other embodiments, the communication module 208 is configured to start the contention resolution timer based on based upon a predetermined timing (also referred to herein generally as a designated time or agreed-upon time, to name some examples). For example, where the UE 115 has received multiple TXOPs (in a scheduling grant from the BS 105, for example), the agreed-upon time may be the at end of one of the TXOPs in the time period. As just one example, where there are three TXOPs scheduled for the UE 115, the agreed-upon time may be at the end of the first TXOP, at the end of the second TXOP, or at the end of the third TXOP—regardless of which TXOP (if any) results in a successful transmission from the UE 115 to the BS 105. This is just one numeric example.

If the agreed-upon time is closer to the start of the multiple TXOPs in the time period, this may result in more quickly recognizing a response from the BS 105 because the UE 115 is monitoring the PDCCH once the timer starts (though it may result in selecting a longer timer or more timeouts, in situations where the UE 115's transmission is not successful until a later TXOP in the time period). If the agreed-upon time is closer to the last of the multiple TXOPs, this may result in the UE 115 waiting longer to monitor PDCCH (e.g., where the UE 115's transmission was successful at an earlier TXOP in the time period) though it may result in selecting a shorter timer.

According to further embodiments of the present disclosure, the communication module 208 is further configured to control message inspection in a two-step RACH procedure. Where, for example, the BS 105 determines that the msgB has a payload size above a threshold value, the BS 105 may split the msgB into multiple parts. The BS 105 will include, in an earlier msgB part, an indication (also referred to herein as an identifier, for example) that there is a subsequent msgB part to follow. Thus, the communication module 208 of the UE 115 may, upon receipt of a msgB from the BS 105 during the time period (e.g., an access response window), inspect the msgB for both an identifier associated with the UE 115 (e.g., a random access identifier or a UE-identifier) as well as an indication of subsequent msgB(s) from the BS 105 during the access response window. If the communication module 208 locates an identifier associated with the UE 115 in the received msgB during the access response window, then the UE 115 does not need to listen for any additional msgBs in the access response window (e.g., even if one is indicated in the current, received msgB).

If the communication module 208 does not detect an identifier associated with the UE 115 in the received msgB, the communication module 208 also checks the indication for a subsequent msgB. If the communication module 208 does detect an indication of a subsequent msgB from the BS 105 for the present access response window, then the communication module 208 will cause the UE 115 to continue monitoring within the access response window for the next part of the msgB from the BS 105. In some embodiments, the monitoring may include blind searching in the access response window. In other embodiments, the msgB may further include, with the indication of the subsequent msgB, a DL grant for the subsequent part of the msgB in the access response window. In these embodiments, the UE 115 does not need to blind search the access response window, but rather may listen for the subsequent msgB based on the identified DL grant indicated in the earlier msgB. Further, the msgB may include the time or slot for the subsequent part of the msgB transmission in the random access response window. The UE 115 may listen for the subsequent msgB based on the identified time or slot, reducing UE complexity and power consumption while minimizing the overhead introduced in msgB transmission. In yet other further, or alternative, embodiments, the msgB may also include a list of identifiers associated with UEs that will be included in the subsequent, indicated msgB in the access response window.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the communication module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
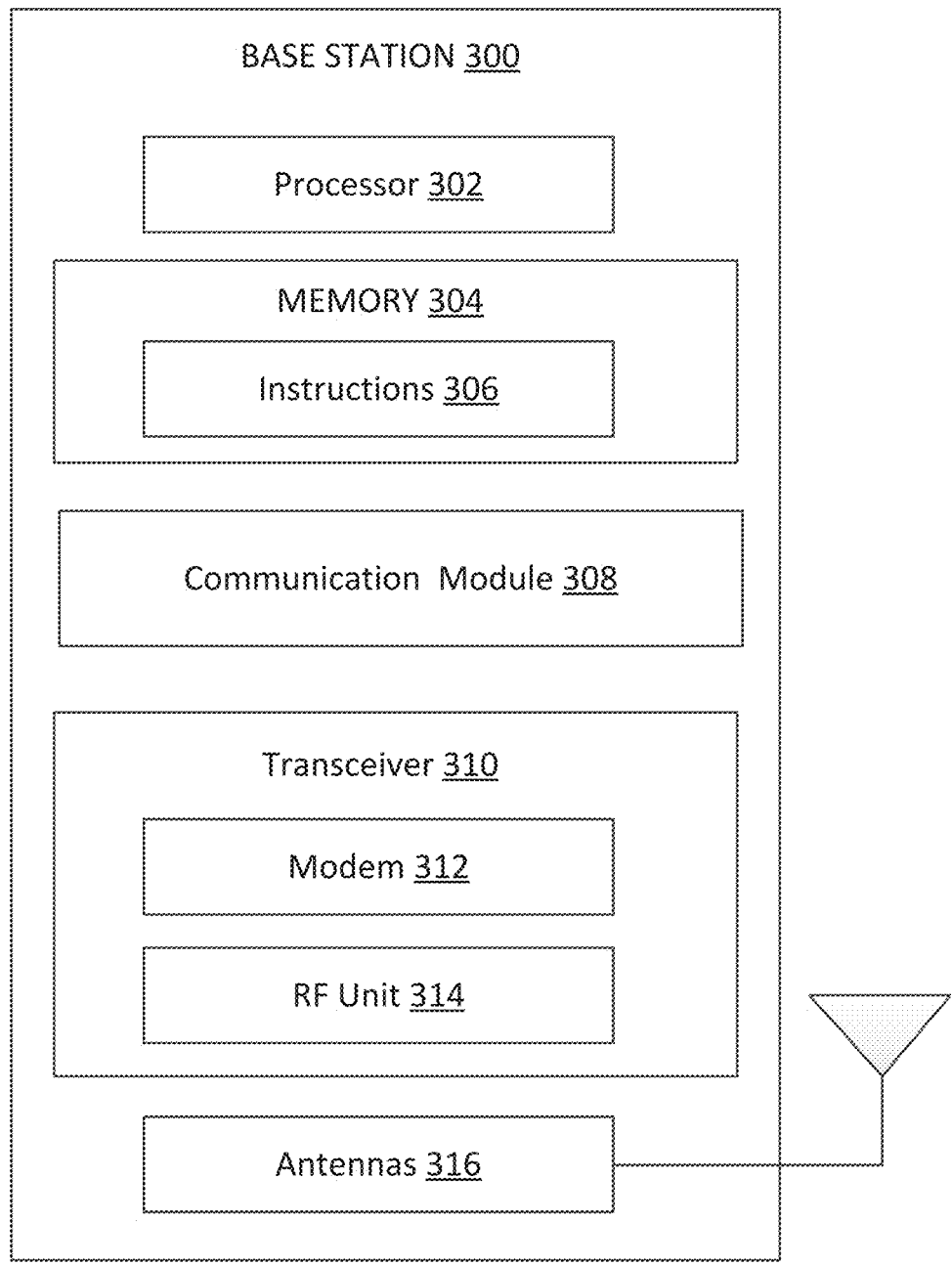
FIG. 3 is a block diagram of an exemplary base station (BS) according to some embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, a communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 2.

The communication module 308 may be implemented via hardware, software, or combination thereof. For example, the communication module 308 may be implemented as a processor, circuit, and/or instructions 306 stored in the memory 304 and executed by the processor 302. The communication module 308 may be used for various aspects of the present disclosure. For example, the communication module 308 is configured to transmit to a UE (e.g., a UE 115) reference signal configurations, scheduling grants and random access messaging, perform LBTs, schedule the UE 115 based on the LBTs, monitor for the UE's UL transmissions based on the scheduling grants, track contention resolution timers, and split up larger random access messages to UEs 115. For example, the random access messaging may include determining TXOPs for UEs 115 within the random access period, and transmitting the determined TXOPs to the UEs 115.

In an embodiment, the communication module 308 is configured to make determinations and transmit the results of those determinations in a RACH procedure. For example, the communication module 308 is configured to determine multiple TXOPs for a UE 115. In a four-step RACH procedure, the communication module 308 is configured to transmit, in msg2, the UL grant for the multiple TXOPs to the UE 115. As another example, in a two-step RACH procedure the communication module 308 is configured to transmit, in RMSI or a PDCCH order, the UL grant for the multiple TXOPs to the UE 115. As another example, in either two-step or four-step RACH procedures, the communication module 308 is configured to determine that a retransmission from the UE 115 should be performed (e.g., due to poor reception, etc.) and provides a new set of TXOPs for the UE 115 that the BS 105 transmits (e.g., via PDCCH) to the UE 115 to try again.

According to embodiments of the present disclosure, the communication module 308 is further configured to monitor a UE's contention resolution window in a RACH procedure (e.g., either two-step or four-step). For example, the BS 105 may transmit a contention resolution timer to the UE 115 in a SIB message at a prior time. In some embodiments, the communication module 308 is configured to start the contention resolution timer associated with the UE 115 based on upon a predetermined timing. For example, where the BS 105 has transmitted multiple TXOPs for the UE 115 in the time period, the agreed-upon time may be at the end of the first TXOP, at the end of the next TXOP, etc. on until the last identified TXOP for the time period. This may occur regardless of which TXOP (if any) results in the UE 115 successfully transmitting a random access message to the BS 105.

According to further embodiments of the present disclosure, the communication module 308 is further configured to modify msgB transmission in a two-step RACH procedure. The communication module 308 is configured to determine whether the payload size of a msgB is sufficiently large, e.g. larger than a threshold. If the payload size is sufficiently large, the communication module 308 is configured to split the msgB into multiple parts that are then transmitted separately (e.g., in different times and/or frequencies of the contention resolution window). The communication module 308, once it has split the msgB into multiple parts (each one a respective msgB), then includes an indication in the earlier msgB that there is a subsequent msgB to follow. The communication module 308 does this with each msgB part until the full payload has been transmitted (e.g., broadcast) to the target UEs 115. In some embodiments, the communication module 308 may further include a DL grant for the subsequent part of the msgB in the access response window. In other embodiments, the communication module 308 may simply include the time or slot for the subsequent part of the msgB. In other embodiments, the communication module 308 may further include a list of identifiers associated with UEs that will be transmitted in the subsequent msgB.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4A:
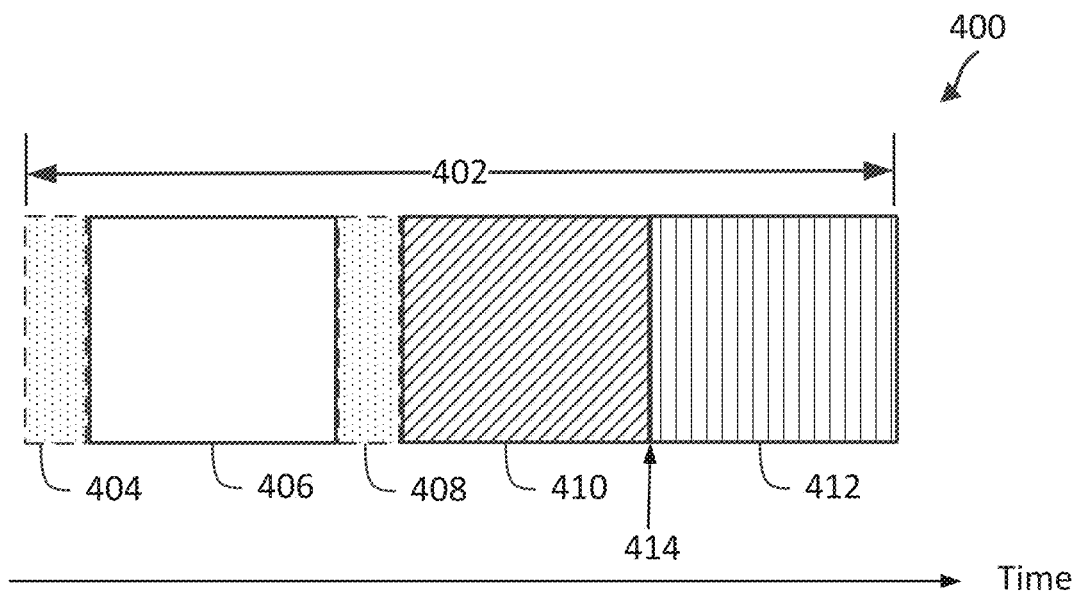
FIG. 4A illustrates aspects of a random access procedure according to some embodiments of the present disclosure.

Turning now to FIG. 4A, aspects of a random access procedure 400 are illustrated according to some embodiments of the present disclosure. In FIG. 4A, the x-axis represents time in some constant units and the y-axis represents frequency in some constant units. The frequency may be, for example, within an unlicensed spectrum at any suitable frequencies. As described above, an LBT is required prior to a transmission in a shared frequency band or unlicensed frequency band and a UE may or may not be able to transmit according to a scheduled time depending on the outcome of the LBT. Accordingly, the scheme 200 schedules UL data transmissions in units of slots 204 and supports half-slot level resolution for starting a UL data transmission. The UL data transmission may be referred to as a PUSCH transmission.

The procedure 400 may be employed between BSs such as the BSs 105 and UEs such as the UEs 115 illustrated in the exemplary network 100 of FIG. 1. The procedure 400 occurs over an access response window 402. As illustrated in FIG. 4A, a UE 115 may be granted multiple TXOPs in the given access response window 402. The UE 115 may perform LBT at the start of each TXOP. FIG. 4A illustrates three TXOPs for sake of illustration; embodiments of the present disclosure are applicable to multiple TXOPs generally.

For example, the UE 115 first performs LBT 404 at the start of a first TXOP 406 in the access response window 402. LBT 404 may be based on energy detection or signal detection (e.g., detecting a particular preamble signal or a certain sequence pattern). The UE 115 fails the LBT 404 if the channel is detected to be in use at the time of LBT 404. In the illustrated example of FIG. 4A, the UE 115 fails the LBT 404 for the first TXOP 406. Thus, during the TXOP 406, the UE 115 does not transmit a random access message to the BS 105 (e.g., either using a two-step RACH procedure or a four-step RACH procedure).

Continuing with the example illustrated in FIG. 4A, at the second TXOP 410, the UE 115 again first performs LBT 408. In the illustrated example, the UE 115 is successful at TXOP 410—in other words, the UE 115 determined from performing LBT 408 that the channel was clear for transmitting a random access message to the BS 105. Thus, though the UE 115 was granted a total of three TXOPs within the access response window 402 (including TXOP 406, TXOP 410, and TXOP 412), the UE 115 does not need to use TXOP 412 to transmit its access response message.

According to embodiments of the present disclosure, the UE 115 may start a contention resolution timer after successfully transmitting the random access message during the TXOP 410, identified as timer start 414 in FIG. 4A. Thus, though there are multiple TXOPs in FIG. 4A, the UE 115 does not start the contention resolution timer until successfully transmitting the random access message. FIG. 4A is by way of illustration only; had the transmission been successful during TXOP 406, timer start 414 would have occurred at the end of TXOP 406. Likewise, had the transmission been successful during TXOP 412, the timer start 414 would have occurred at the end of TXOP 412.

Alternatively, where the UE 115 is not successful in transmitting the random access message during any of the TXOPs in an access response window 402, timer start 414 may be set to occur at the end of the last TXOP in the access response window 402. In the example illustrated in FIG. 4A, there are three TXOPs—thus, where the UE 115 fails in each TXOP (with an LBT for TXOP 412, similar to the LBTs for the other TXOPs, not illustrated in FIG. 4A), the timer start 414 may occur at the end of TXOP 412 (the last TXOP of the access response window 402). As a result, even where the UE 115 is unsuccessful in each possible TXOP, the timer start 414 may still occur (e.g., a contention resolution timer) so that the RACH procedure may have an opportunity to restart instead of continuing monitoring PDCCH.

While timer start 414 is discussed above as occurring as a start, embodiments of the present disclosure are likewise applicable to timer restarts. These may occur in situations where the UE 115 has received a PDCCH from the BS 105 that includes a request for the UE 115 to retransmit its random access message (including multiple TXOPs in the PDCCH for the UE 115 to attempt retransmitting in). In such situations, the same approach discussed above applies—where the random access message is successfully transmitted during one of the TXOPs identified in the PDCCH, the timer restart 414 occurs at the end of that TXOP. Where the random access message is not successfully transmitted during any of the TXOPs, the time restart 414 may occur at the end of the last TXOP, as discussed above.

Figure 4B:
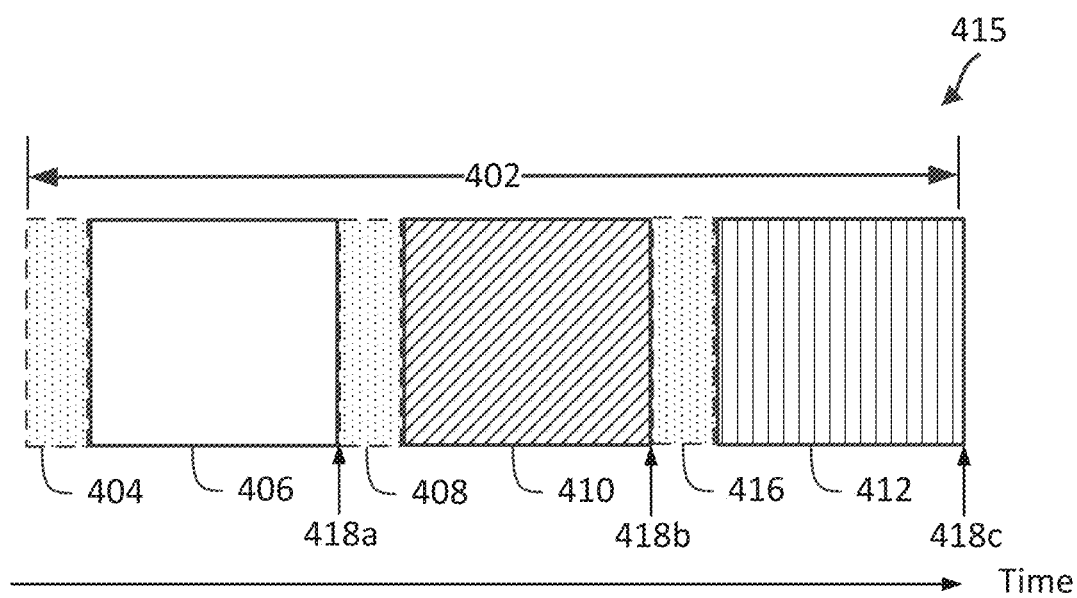
FIG. 4B illustrates aspects of a random access procedure according to some embodiments of the present disclosure.

FIG. 4B illustrates aspects of a random access procedure 415 according to some embodiments of the present disclosure. Elements common to those discussed with respect to FIG. 4A are commonly numbered, including access response window 402, LBT 404, TXOP 406, LBT 408, TXOP 410, and TXOP 412. FIG. 4B further illustrates LBT 416 for TXOP 412 (e.g., as would be used for TXOP 412 in FIG. 4A where the UE 115 fails in the prior TXOPs to transmit the random access message).

FIG. 4B further illustrates timer starts 418a, 418b, and 418c—corresponding to the end of each possible TXOP in the example random access procedure 415. Although three TXOPs are illustrated in FIG. 4B, like in FIG. 4A, embodiments of the present disclosure are applicable to multiple TXOPs generally. According to the embodiments of FIG. 4B, the timer start 418 may occur at the UE 115 at a pre-agreed time (e.g., agreed between the UE 115 and the BS 105) after one of the TXOPs in the access response window 402. For example, the pre-agreed time may be after the first TXOP 406 in the FIG. 4B example. Thus, timer start 418a starts the contention resolution timer at the pre-agreed time. Though the contention resolution timer starts in this example at timer start 418a, that is done regardless of whether the UE 115 has been successful in transmitting the random access message yet. Thus, though the timer may start at timer start 418a, the UE 115 may not be successful until a later TXOP, if at all in the access response window 402.

As another example, the pre-agreed time may be after the next TXOP, TXOP 410, illustrated as timer start 418b in FIG. 4B. Again, though the contention resolution timer starts in this example at timer start 418b, that is done regardless of whether the UE 115 has been successful in transmitting the random access message yet during TXOP 410 (or TXOP 406). In other words, where in this example the pre-agreed time is at timer start 418b, even if the UE 115 was successful in the first TXOP 406 the timer does not start until the later, pre-agreed time.

As yet another example, the pre-agreed time may be after the next TXOP, which in the example of FIG. 4B is the last TXOP 412 in the access response window 402, labeled as timer start 418c. Again, though the contention resolution timer starts in this example at timer start 418c, that is done regardless of whether the UE 115 has been successful in transmitting the random access message yet during TXOP 410 (or TXOP 406). Thus, even if the UE 115 was successful in the first TXOP 406 or the second TXOP 410, the timer does not start until the later, pre-agreed time at timer start 418c. This may be applied to any number of TXOPs for a given access response window.

As noted above, if the agreed-upon time is closer to the start of the multiple TXOPs in the access response window 402, this may result in more quickly recognizing a response from the BS 105 because the UE 115 is monitoring the PDCCH once the timer starts (though it may result in selecting a longer timer or more timeouts, in situations where the UE 115's transmission is not successful until a later TXOP in the access response window 402). If the agreed-upon time is closer to the last of the multiple TXOPs, this may result in the UE 115 waiting longer to monitor PDCCH (e.g., where the UE 115's transmission was successful at an earlier TXOP in the time period) though it may result in selecting a shorter timer.

Figure 5A:
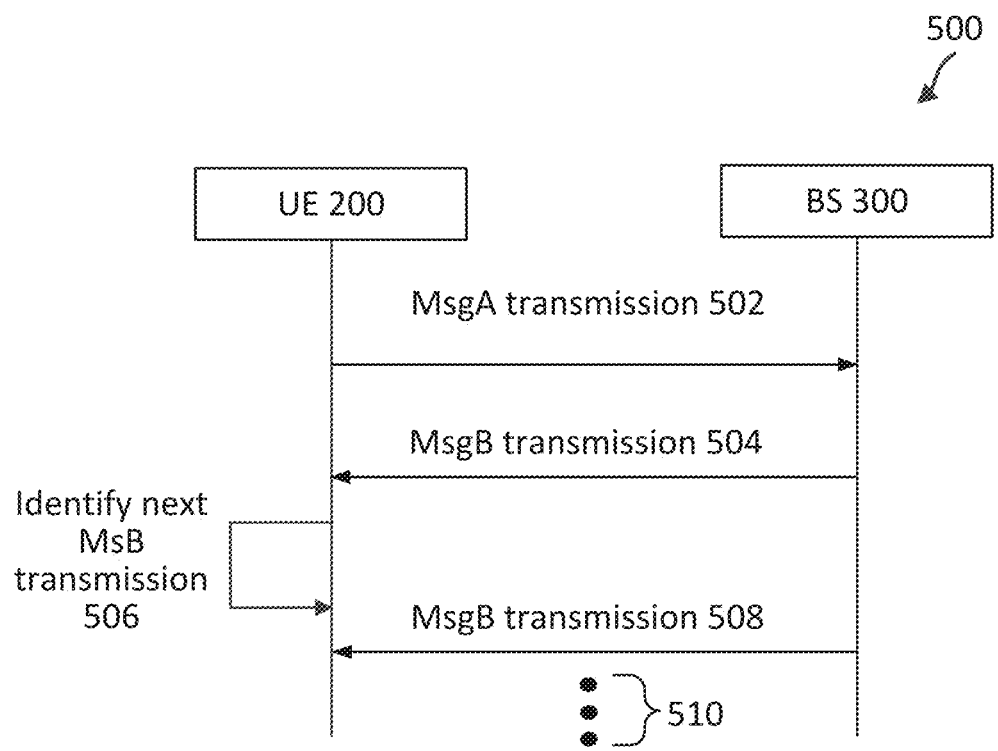
FIG. 5A illustrates aspects of a random access procedure according to some embodiments of the present disclosure.

Embodiments of the present disclosure also apply to improving two-step RACH procedures to reduce UE power consumption and possible latency where the msgB payload becomes large. FIG. 5A illustrates aspects of a random access procedure 500 according to some embodiments of the present disclosure. The procedure 500 may be employed between a BS 300 such as discussed with respect to FIG. 3 above, and an exemplary UE 200 (e.g., exemplary of a plurality) such as discussed with respect to FIG. 2 above.

At action 502, the UE 200 transmits a msgA to the BS 300. The msgA may include what was previously identified in the four-step RACH procedure as msg1 and msg3. This may include a random access preamble, a RRC connection request, a tracking area update, a scheduling request, and a UE identifier (UE-ID).

At action 504, after receiving the msgA the BS 300 determines the size of a msgB payload and, if the size is sufficiently large (e.g., above a threshold size), the BS 300 splits the msgB into multiple msgBs. The BS 300 includes, in the first msgB of multiple, an indicator that there will be a subsequent msgB that the BS 300 will transmit to the UE 200 (e.g., by broadcast). The BS 300 transmits a msgB to the UE 200 that has been modified to include the indicator. The msgB may include what was previously identified in the four-step RACH procedure as msg2 and msg4. This may include, for example, a detected random access preamble ID, TA information, a C-RNTI, a backoff indicator, and a contention resolution.

At action 506, the UE 200 receives the msgB from the BS 300 and checks the msgB for an identifier associated with the UE 200, and if locates it proceeds with the RACH procedure. If, however, the UE 200 does not locate an associated identifier, the UE 200 checks for the indicator to determine if there will be a subsequent msgB with more of the payload. In some embodiments, the indicator also includes a DL grant for the subsequent msgB to reduce the burden on the UE 200 (e.g., instead of the UE blind searching for the subsequent msgB) or, alternatively, simply a time or slot for the subsequent part of the msgB. In some embodiments the indicator may also include a list of UE-associated identifiers that will be in the payload of the subsequent msgB.

At action 508, the BS 300 transmits the indicated subsequent msgB to the UE 200. The UE 200, upon receiving the subsequent msgB, follows the same approach by checking for an associated identifier, and if not found, checking for an indicator that another subsequent msgB is forthcoming from the BS 300 as part of the same initially-large payload.

The BS 300 may transmit further msgB parts as indicated with the label 510 in FIG. 5A, until the full msgB has been transmitted, with the UE 200 following a similar approach for each msgB received during the access response window.

Figure 5B:
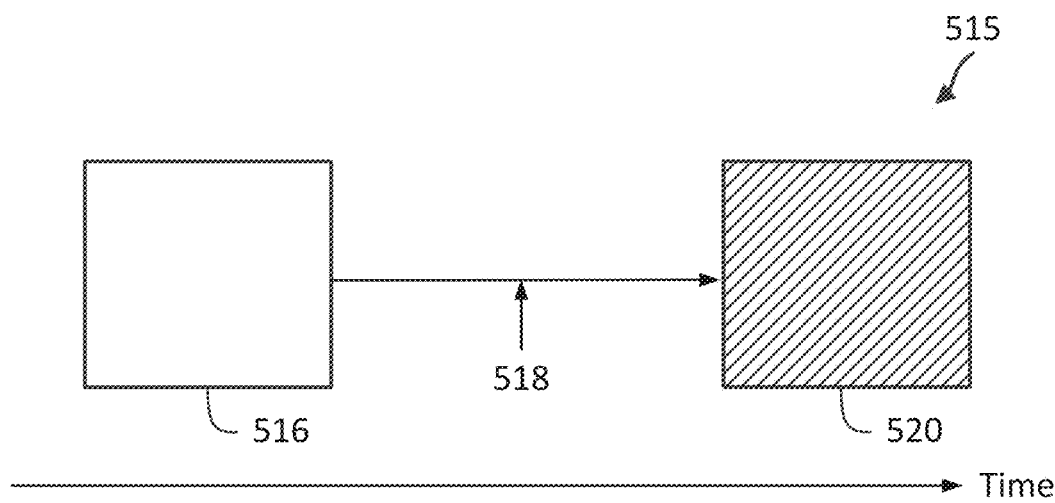
FIG. 5B illustrates aspects of a random access procedure according to some embodiments of the present disclosure.

FIG. 5B illustrates aspects of a random access procedure 515 according to some embodiments of the present disclosure, including as introduced with the procedure 500 from FIG. 5A above. In particular, FIG. 5B illustrates the relationship between parts of a msgB that has been split up to reduce payload size. As illustrated, an earlier msgB 516 indicates 518 the presence or absence of a subsequent msgB 520. A receiving UE checks for the indication 518 and, if present and necessary (e.g., the UE did not locate an associated identifier in the msgB 516), the UE searches for the indicated subsequent msgB 520. Although just two msgBs are illustrated in FIG. 5B, msgB 516 may be any given msgB within a string of msgBs within an access response window—that is, there may be one or more prior msgBs to msgB 516 that indicate that msgB 516 will be transmitted, and one or more subsequent msgBs to msgB 520, depending on the size of the original msgB payload and how the BS determines to split up the payload (e.g., by reducing the size of the payload to below an identified threshold per msgB part).

Figure 6:
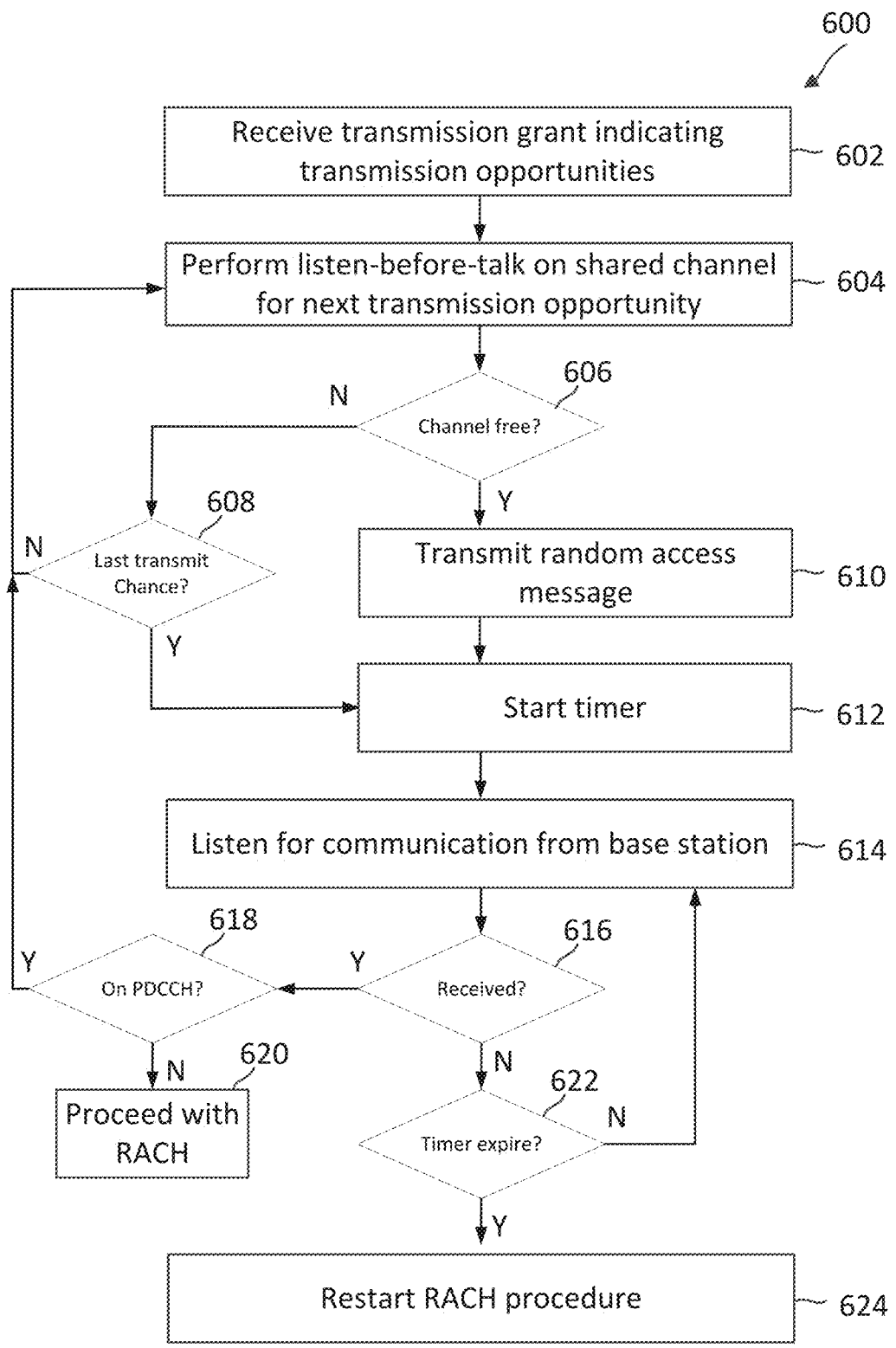
FIG. 6 is a flow diagram of a communication method according to some embodiments of the present disclosure.

FIG. 6 is a flow diagram of a communication method 600 according to some embodiments of the present disclosure. Aspects of the method 600 may be executed by a computing device (e.g., a processor, processing circuit, and/or other suitable component) of a wireless communication device, such as the UEs 115 and 200. As illustrated, the method 600 includes a number of enumerated steps, but embodiments of the method 600 may include additional steps before, after, and in between the enumerated steps. In some embodiments, one or more of the enumerated steps may be omitted or performed in a different order.

At block 602, the UE 200 receives a transmission grant from a BS 300 that identifies multiple TXOPs for a given access response window. For example, in a four-step RACH procedure, the UE 200 receives the transmission grant in a msg2 from the BS 300. In a two-step RACH procedure, the UE 200 receives the transmission grant in RSMI or the PDCCH order. In either four-step or two-step RACH, the UE 200 may alternatively receive the transmission grant in a PDCCH requesting the UE 200 to retransmit a random access message to the BS 300 (e.g., where the UE 200 already had a TXOP that successfully transmitted the random access message, but which could not be properly decoded at the BS 300).

At block 604, the UE 200 performs LBT on the shared channel (e.g., shared in licensed or in unlicensed spectrum) in the next TXOP specified for the access response window.

At decision block 606, if the channel is not free as sensed by the LBT, then the method 600 proceeds to decision block 608.

At decision block 608, the UE 200 determines whether the last TXOP has just ended for the access response window. If not, then the method 600 returns to block 604 and proceeds as laid out above and further below. If it is the last TXOP for the window, then the method proceeds to block 612.

At block 612, the UE 200 starts the contention resolution timer even though the UE 200 did not succeed at transmitting the random access message to the BS 300 in any of the possible TXOPs of the access response window.

Returning to decision block 606, if the channel is identified as free during the LBT from block 604, then the method 600 instead proceeds to block 610.

At block 610, the UE 200 transmits the random access message to the BS 300 during the TXOP where the channel is sensed as available.

Returning to block 612, upon transmitting the random access message, the UE 200 starts the contention resolution timer (e.g., at the end of the successful TXOP).

Whether the timer starts in response to a successful transmission or a failure to transmit in any of the available TXOPs, the method 600 proceeds from block 612 to block 614.

At block 614, the UE 200 listens for a communication from the BS 300, such as on PDCCH or as part of the RACH procedure.

At decision block 616, the UE 200 determines whether a communication has been received from the BS 300. If a communication has been received, then the method 600 proceeds to decision block 618.

At decision block 618, the UE 200 determines whether the communication from the BS 300 is a retransmit command on PDCCH or a confirmation from the BS 300 (e.g., a msg4 or msgB, depending on RACH procedure). If the communication from the BS 300 is a command on PDCCH, then the method 600 returns to block 604 (e.g., after stopping the timer started at block 612) and proceeds as laid out above and below, where the timer start then refers potentially to a timer restart.

If the communication is not a command on PDCCH, but rather the UE 200 determines at block 618 that the communication is a confirmation such as msg4 or msgB, then the method 600 proceeds to block 620.

At block 620, the UE 200 proceeds with the RACH procedure by, for example, completing the RACH procedure to complete attachment to a network.

Returning to decision block 616, if the UE determines that a communication has not been received from the BS 300, the method 600 proceeds to decision block 622.

At decision block 622, the UE 200 determines whether the timer started/restarted at block 612 has expired. If not, then the method 600 returns to block 614 and proceeds as laid out above and below. If the timer has expired, then the method 600 proceeds to block 624.

At block 624, the UE 200 restarts the RACH procedure in response to the timer having expired.

Figure 7A:
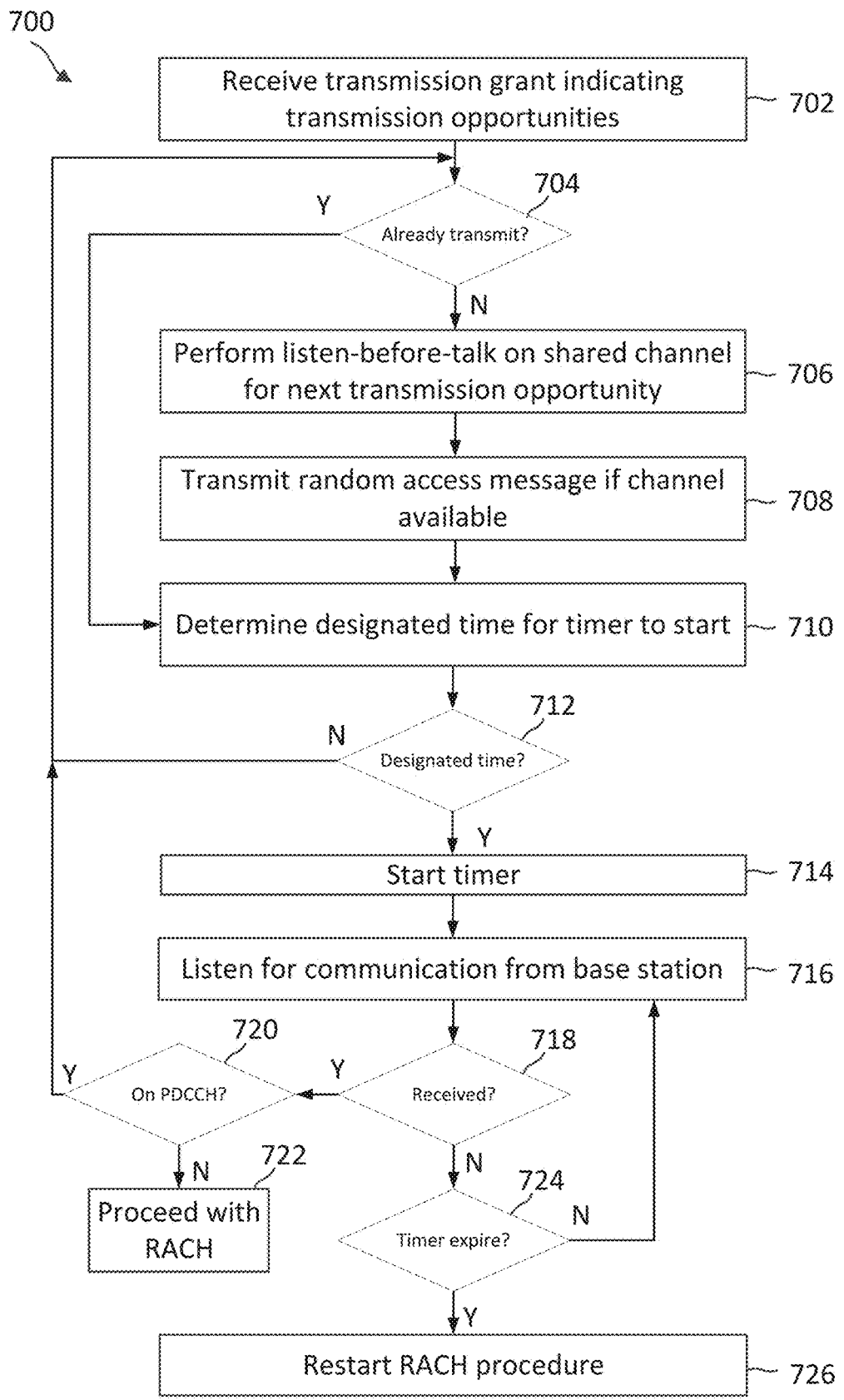
FIG. 7A is a flow diagram of a communication method according to some embodiments of the present disclosure.

FIG. 7A is a flow diagram of a communication method 700 according to some embodiments of the present disclosure. Aspects of the method 700 may be executed by a computing device (e.g., a processor, processing circuit, and/or other suitable component) of a wireless communication device, such as the UEs 115 and 200. As illustrated, the method 700 includes a number of enumerated steps, but embodiments of the method 700 may include additional steps before, after, and in between the enumerated steps. In some embodiments, one or more of the enumerated steps may be omitted or performed in a different order.

At block 702, the UE 200 receives a transmission grant from a BS 300 that identifies multiple TXOPs for a given access response window, for example as discussed with respect to block 602 of FIG. 6.

At decision block 704, if the UE 200 has already transmitted the random access message to the BS 300 during one of the TXOPs of the access response window, then the method proceeds to block 710 as will be discussed further below. If, instead, the UE 200 has not yet already transmitted the random access message, then the method 700 proceeds to block 706.

At block 706, the UE 200 performs LBT on the shared channel (e.g., shared in licensed or in unlicensed spectrum) in the next TXOP specified for the access response window.

At block 708, the UE 200 transmits the random access message to the BS 300 during the TXOP where the channel is sensed as available.

At block 710, the UE 200 determines a designated time, also referred to herein as a pre-agreed time, for the contention resolution timer to start/restart (e.g., where the method 700 is occurring during a requested retransmission). According to embodiments of the present disclosure, the designated time may be at the end of one of the TXOPs in the access response window.

At decision block 712, if the designated time has not arrived yet, then the method 700 returns back to decision block 704 and the method 700 proceeds as discussed above and further below.

Returning to decision block 712, if the designated time has arrived as determined by the UE 200, then the method 700 proceeds to block 714.

At block 714, the UE 200 starts the contention resolution timer regardless of whether the UE 200 has been successful in transmitting the random access message or not during the access response window.

At block 716, the UE 200 listens for a communication from the BS 300, such as on PDCCH or as part of the RACH procedure.

At decision block 718, the UE 200 determines whether a communication has been received from the BS 300. If a communication has been received, then the method 700 proceeds to decision block 720.

At decision block 720, the UE 200 determines whether the communication from the BS 300 is a retransmit command on PDCCH or a confirmation from the BS 300 (e.g., a msg4 or msgB, depending on RACH procedure). If the communication from the BS 300 is a command on PDCCH, then the method 700 returns to decision block 704 (e.g., after stopping the timer started at block 714) and proceeds as laid out above and below, where the timer start then refers potentially to a timer restart.

If the communication is not a command on PDCCH, but rather the UE 200 determines at block 720 that the communication is a confirmation such as msg4 or msgB, then the method 700 proceeds to block 722.

At block 722, the UE 200 proceeds with the RACH procedure by, for example, completing the RACH procedure to complete attachment to a network.

Returning to decision block 718, if the UE determines that a communication has not been received from the BS 300, the method 700 proceeds to decision block 724.

At decision block 724, the UE 200 determines whether the timer started/restarted at block 714 has expired. If not, then the method 700 returns to block 716 and proceeds as laid out above and below. If the timer has expired, then the method 700 proceeds to block 726.

At block 726, the UE 200 restarts the RACH procedure in response to the timer having expired.

Figure 7B:
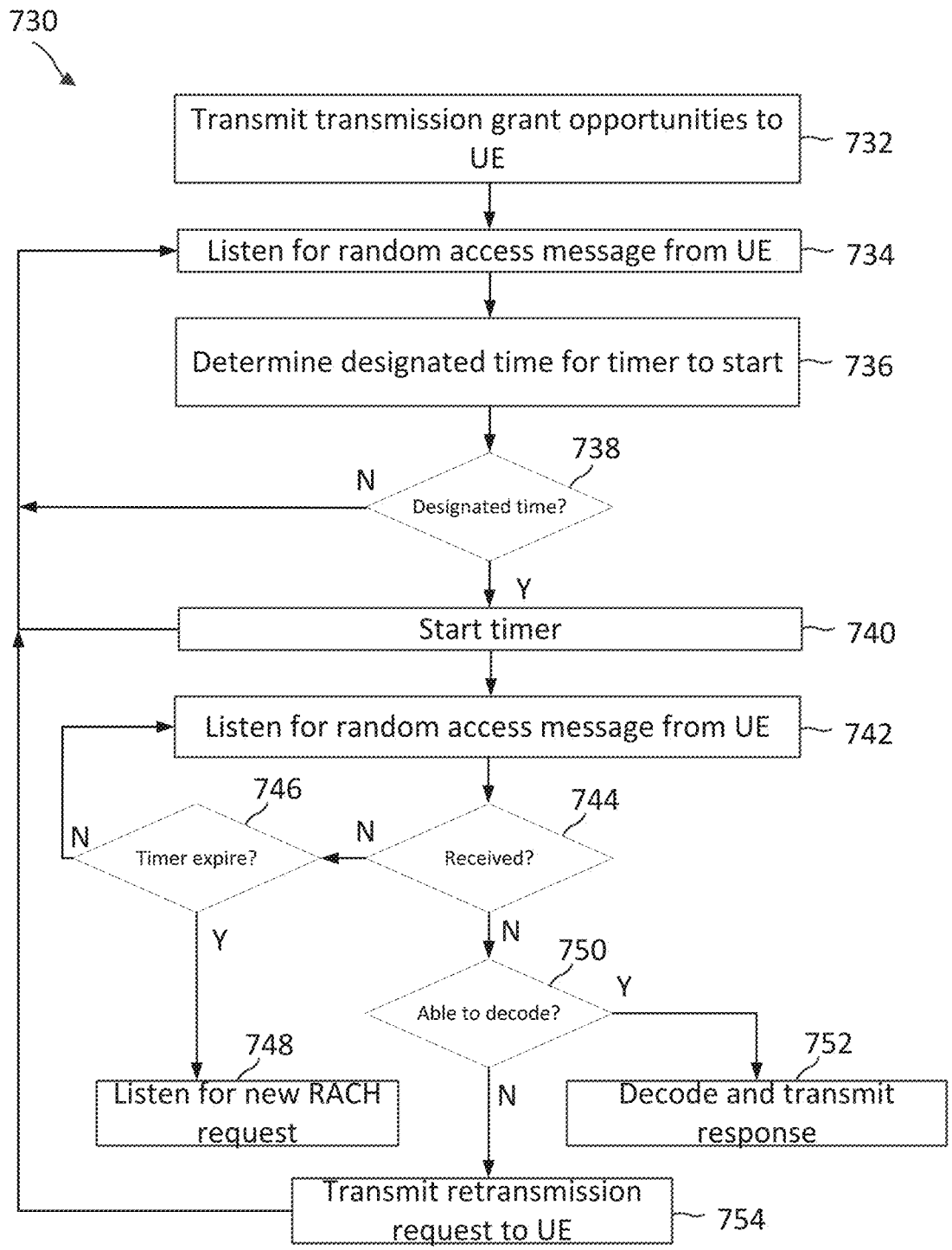
FIG. 7B is a flow diagram of a random access method according to some embodiments of the present disclosure.

Turning now to FIG. 7B, a flow diagram of a communication method 730 is illustrated according to some embodiments of the present disclosure. Aspects of the method 730 may be executed by a computing device (e.g., a processor, processing circuit, and/or other suitable component) of a wireless communication device, such as the BSs 105 and 300. As illustrated, the method 730 includes a number of enumerated steps, but embodiments of the method 730 may include additional steps before, after, and in between the enumerated steps. In some embodiments, one or more of the enumerated steps may be omitted or performed in a different order.

At block 732, the BS 300 transmits a transmission grant to a UE 200 that identifies multiple TXOPs for a given access response window.

At block 734, the BS 300 listens for a random access message from the UE 200.

At block 736, the BS 300 determines a designated time for the contention resolution timer at the UE 200 to start/restart (e.g., where the method 730 is occurring during a requested retransmission). According to embodiments of the present disclosure, the designated time may be at the end of one of the TXOPs in the access response window.

At decision block 738, if the designated time has not arrived yet, then the method 730 returns back to block 734 and the method 730 proceeds as discussed above and further below.

Returning to decision block 738, if the designated time has arrived as determined by the BS 300, then the method 730 proceeds to block 740.

At block 740, the BS 300 starts the contention resolution timer regardless of whether the UE 200 has been successful in transmitting the random access message or not during the access response window to the BS 300.

At block 742, if the BS 300 has not yet received the random access message from the UE 200, then the BS 300 listens for the random access message from the UE 200.

At decision block 744, the BS 300 determines whether it has received a random access message from the UE 200 during one of the TXOPs for the UE 200. If not, then the method 730 proceeds to decision block 746.

At decision block 746, if the timer has not yet expired, then the method 730 returns to block 742 to continue listening for a random access message. If, instead at decision block 746 the timer has expired, then the method 730 proceeds to block 748.

At block 748, because the timer has expired, the BS 300 determines that the UE 200 will restart the RACH procedure and therefore listens for a new RACH request (whether according to four-step or two-step RACH) from the UE 200.

Returning to decision block 744, if the BS has received a random access message from the UE 200 (whether before or after the timer started), then the method 730 proceeds to decision block 750.

At decision block 750, the BS 300 determines whether it is able to decode the random access message from the UE 200. If able to decode (and do so before the timer expires), then the method 730 proceeds to block 752.

At block 752, the BS 300 decodes the random access message and transmits a response to the UE 200.

Returning to decision block 750, if the BS 300 is not able to decode the random access message, then the method 730 proceeds to block 754.

At block 754, the BS 300 transmits a retransmission request to the UE 200, for example on PDCCH. The method 730 returns to block 734 to listen for a random access message and restart the timer at the designated time. If the BS 300 is not able to transmit the retransmission request to the UE 200 before the timer expires, then the BS 300 will operate in accordance with block 748 and listens for a new RACH request from the UE 200.

Figure 8A:
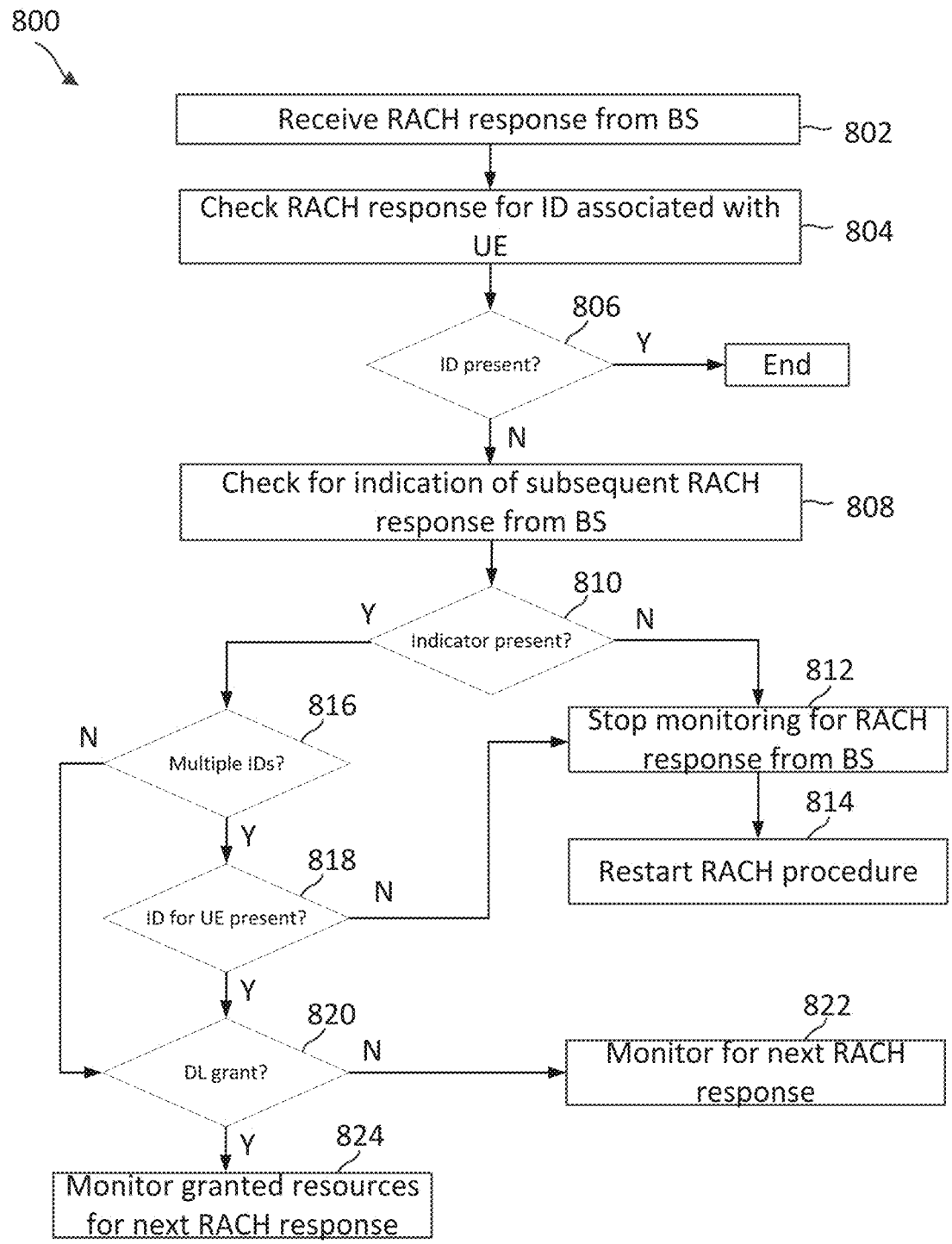
FIG. 8A is a flow diagram of a communication method according to some embodiments of the present disclosure.

FIG. 8A is a flow diagram of a communication method 800 according to some embodiments of the present disclosure. Aspects of the method 800 may be executed by a computing device (e.g., a processor, processing circuit, and/or other suitable component) of a wireless communication device, such as the UEs 115 and 200. As illustrated, the method 800 includes a number of enumerated steps, but embodiments of the method 800 may include additional steps before, after, and in between the enumerated steps. In some embodiments, one or more of the enumerated steps may be omitted or performed in a different order.

At block 802, the UE 200 receives a RACH response from the BS 300. For example, the RACH response may be msgB in a two-step RACH procedure (e.g., in response to the UE 200 previously transmitting msgA to the BS 300).

At block 804, the UE 200 checks the RACH response received at block 802 to determine whether the RACH response includes an identifier associated with the UE 200 (e.g., a random access identifier such as RA-RNTI or other UEID).

At decision block 806, if the RACH response included an identifier associated with the UE 200, then the method 800 proceeds to end. Instead, if the RACH response did not include an identifier associated with the UE 200, then the method 800 proceeds to block 808.

At block 808, the UE 200 checks the RACH response for an indication of a subsequent RACH response being sent from the BS 300 during the access response window.

At decision block 810, if the indicator is not present, then the method 800 proceeds to block 812.

At block 812, the UE 200 stops monitoring for a RACH response from the BS 300 during the access response window.

At block 814, the UE 200 restarts the RACH procedure in response to stopping at block 812.

Returning to decision block 810, if the indicator is present, then the method 800 proceeds instead to decision block 816.

At decision block 816, the UE 200 determines whether the RACH response from the BS 300 included identifiers associated with UEs that will be included in the next RACH response (i.e., part of the overall RACH response from the BS 300 during the access response window, split up due to e.g. payload size). If included, then the method 800 proceeds to decision block 818.

At decision block 818, the UE 200 determines whether any of the identifiers are associated with the UE 200 for the next RACH response. If not there, then the UE 200 may determine to proceed to block 812 as laid out above. The UE 200 may instead determine to still monitor for the next RACH response to determine whether that next RACH response itself identifies that a future RACH response will identify the UE 200.

If, at decision block 818, an identifier associated with the UE 200 is present in the RACH response as part of the indication of a subsequent RACH response, then the method 800 proceeds to decision block 820.

Returning to decision block 816, if the UE 200 determines that the RACH response does not include identifiers associated with UEs to be included in the next RACH response, then the method 800 proceeds directly to decision block 820.

However the method 800 reaches decision block 820, at decision block 820 the UE 200 determines whether the BS 300 included in the indicator a DL grant (or simply time or slot information) for the next RACH response. If not included, then the method 800 proceeds to block 822.

At block 822, the UE 200 monitors for the next RACH response from the BS 200, for example using blind searching.

Returning to decision block 820, if the BS included a DL grant (or time/slot) as part of the indicator for the next RACH response, then the method 800 proceeds instead to block 824.

At block 824, the UE 200 monitors for the next RACH response from the BS 200 at the identified resources from the DL grant (or during the identified time/slot as applicable).

Figure 8B:
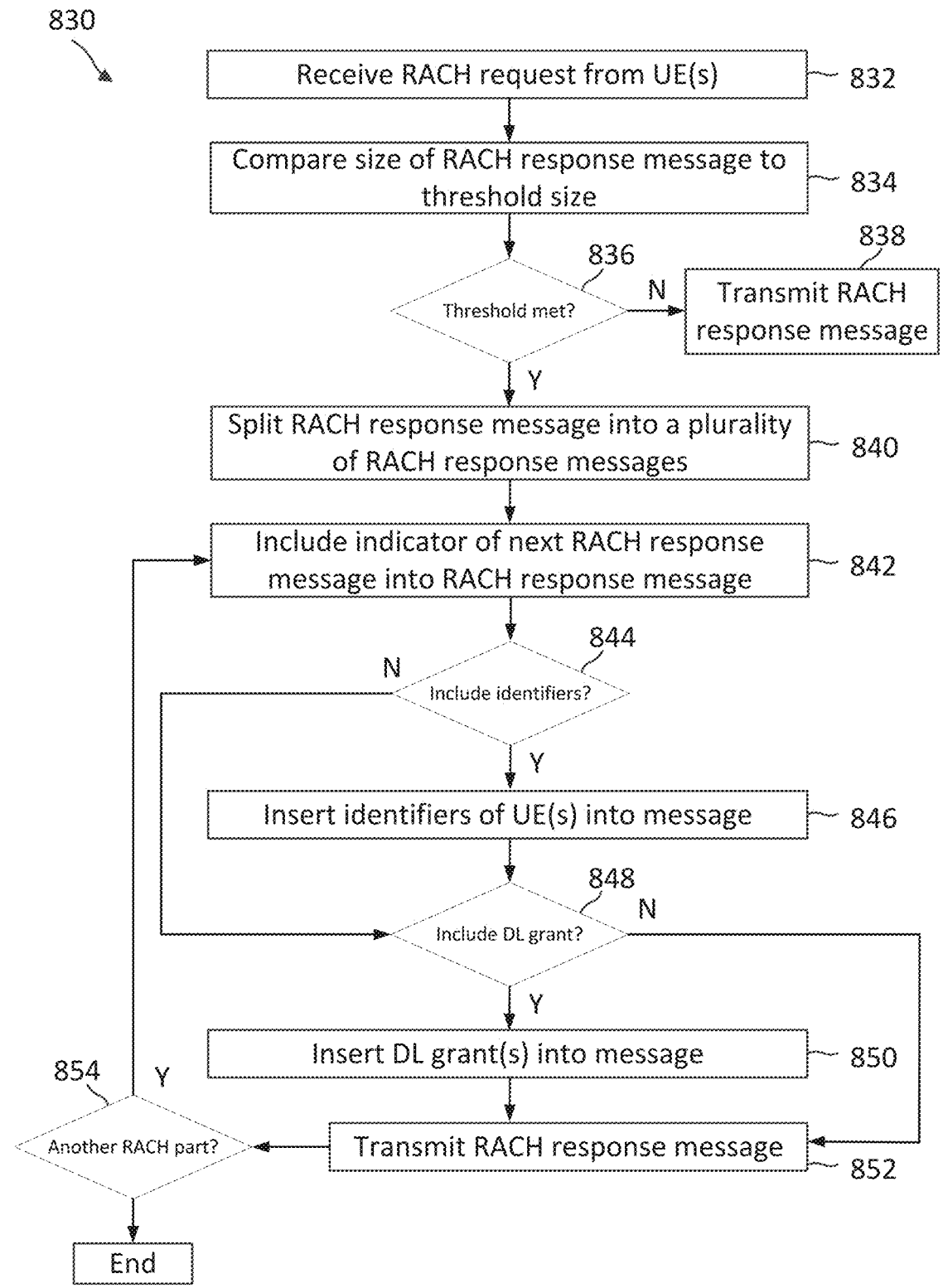
FIG. 8B is a flow diagram of a random access method according to some embodiments of the present disclosure.

FIG. 8B is a flow diagram of a communication method 830 according to some embodiments of the present disclosure. Aspects of the method 830 may be executed by a computing device (e.g., a processor, processing circuit, and/or other suitable component) of a wireless communication device, such as the BSs 105 and 300. As illustrated, the method 830 includes a number of enumerated steps, but embodiments of the method 830 may include additional steps before, after, and in between the enumerated steps. In some embodiments, one or more of the enumerated steps may be omitted or performed in a different order.

At block 832, the BS 300 receives a RACH request from a UE 200. For example, the RACH request may be a msgA as part of a two-step RACH procedure. The BS 300 may receive such requests from multiple UEs 200 within its coverage.

At block 834, the BS 300 generates a RACH response (e.g., a msgB) and compares the size of the RACH response (e.g., the payload size) to a threshold size. For example, the threshold size may be identified with a number of bits, a number of UEs included in the payload, or some other metric.

At decision block 836, the BS 300 determines whether the threshold has been met from the comparison at block 834. If not, then the method 830 proceeds to block 838, where the BS 300 transmits the RACH response without splitting up the payload.

If the threshold has been met, then the method 830 instead proceeds to block 840. At block 840, the BS 300 splits the RACH response into a plurality of smaller RACH response messages (e.g., a plurality of smaller RACH response messages). The BS 300 may split up the RACH response into the target number of smaller RACH response messages at the same time, or over time.

At block 842, the BS 300 includes an indicator in the current RACH response that is to be transmitted. The indicator informs the UE 200 receiving the RACH response that, if the UE 200 does not locate an appropriate identifier associated with the UE 200 in the RACH response to monitor for the subsequent RACH response in the access response window.

At decision block 844, the BS 300 determines whether to include identifiers of UEs 200 that will be included in the subsequent RACH response in the access response window. If included, then the method 830 proceeds to block 846.

At block 846, the BS 300 includes identifiers for UEs 200 that will be included in the subsequent RACH response. The method 830 then proceeds to decision block 848.

Returning to decision block 844, if the BS 300 determines that identifiers of UEs for the subsequent RACH response will not be included, then the method 830 proceeds to decision block 848.

At decision block 848, the BS 300 determines whether to include a DL grant (or simply time or slot information) for the subsequent RACH response. If included, then the method 830 proceeds to block 850.

At block 850, the BS 300 inserts the DL grant (or time/slot information as appropriate) as part of the indication of the subsequent RACH response in the access response window. The method 830 then proceeds to block 852.

Returning to decision block 848, if the BS 300 determines that a DL grant will not be included for the subsequent RACH response, then the method 830 proceeds to block 852.

At block 852, the BS 300 transmits the RACH response message with the indication of subsequent RACH response.

At decision block 854, the BS 300 determines whether there is a subsequent RACH response. If not, then the method 830 ends. Otherwise, the method 830 returns to block 842 and proceeds as laid out above (e.g., in situations where a RACH response is broken down into multiple RACH responses to reduce the payload size of a given RACH response).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method for wireless communication, including receiving, by a first wireless communication device from a second wireless communication device, a plurality of transmit opportunities in a shared channel; determining, by the first wireless communication device, a designated time from among the plurality of transmit opportunities; and triggering, by the first wireless communication device, a timer in response to reaching the determined designated time regardless of whether a random access message has been successfully transmitted during one of the plurality of transmit opportunities.

The method may also include restarting, by the first wireless communication device, a random access procedure in response to the timer expiring before the first wireless communication device receives an instruction from the second wireless communication device during a period of the timer. The method may also include wherein the instruction comprises a response to the random access message. The method may also include wherein the instruction comprises a physical downlink control channel (PDCCH) message instructing the first wireless communication device to retransmit the random access message. The method may also include wherein the designated time comprises a first transmit opportunity from among the plurality of transmit opportunities. The method may also include wherein the designated time comprises a last transmit opportunity from among the plurality of transmit opportunities. The method may also include wherein the designated time comprises a transmit opportunity after a first transmit opportunity, but before a last transmit opportunity, from among the plurality of transmit opportunities. The method may also include wherein the random access message is part of a four-step random access procedure. The method may also include wherein the random access message is part of a two-step random access procedure.

Further embodiments of the present disclosure include a method for wireless communication including receiving, by a first wireless communication device from a second wireless communication device during a two-step random access procedure, a random access response in a shared channel during a random access window; determining, by the first wireless communication device in response to the random access response not including an identifier of the first wireless communication device, whether the random access response includes an indication of a subsequent random access response pending from the second wireless communication device during the random access window; and monitoring, by the first wireless communication device, for the subsequent random access response from the second wireless communication device in the shared channel in response to determining that the random access response includes the indication during the random access window.

The method may also include stopping, by the first wireless communication device, monitoring of the shared channel in response to determining that the random access response does not include the indication during the random access window. The method may also include restarting, by the first wireless communication device, the two-step random access procedure in response to the random access response not including the indication and an identifier associated with the first wireless communication device. The method may also include obtaining, by the first wireless communication device, a downlink grant for the subsequent random access response from the random access response. The method may also include wherein the indication in the random access response further comprises a plurality of identifiers to be included in the subsequent random access response, the method further comprising checking, by the first wireless communication device, the indication for an identifier associated with the first wireless communication device from among the plurality of communication device identifiers. The method may also include stopping, by the first wireless communication device, monitoring of the shared channel in response to the plurality of communication device identifiers not including the identifier associated with the first wireless communication device.

Further embodiments of the present disclosure include a method of wireless communication, including transmitting, by a first wireless communication device to a second wireless communication device, a plurality of transmit opportunities in a shared channel; determining, by the first wireless communication device, a designated time from among the plurality of transmit opportunities; and triggering, by the first wireless communication device, a timer in response reaching the determined designated time regardless of whether a random access message has been successfully transmitted during one of the plurality of transmit opportunities.

The method may also include receiving, by the first wireless communication device, a message from the second wireless communication device; and transmitting, by the first wireless communication device to the second wireless communication device, a retransmission request in response to an inability to decode the message, the retransmission request comprises a new plurality of transmit opportunities. The method may also include restarting, by the first wireless communication device, the timer in response to the transmitting the retransmission request and reaching the determined designated time after transmitting the retransmission request, regardless of whether a resent random access message has been successfully transmitted during one of the new plurality of transmit opportunities. The method may also include wherein the designated time comprises a first transmit opportunity from among the plurality of transmit opportunities. The method may also include wherein the designated time comprises a last transmit opportunity from among the plurality of transmit opportunities. The method may also include wherein the designated time comprises a transmit opportunity after a first transmit opportunity, but before a last transmit opportunity, from among the plurality of transmit opportunities. The method may also include wherein the random access message is part of a four-step random access procedure. The method may also include wherein the random access message is part of a two-step random access procedure.

Further embodiments of the present disclosure include a method of wireless communication, including determining, by a first wireless communication device, whether to transmit a plurality of random access responses during a two-step random access procedure in a shared channel during a random access window; including, by the first wireless communication device in response to determining to transmit a plurality of random access responses, into a first random access response from the plurality of random access responses an indication of a second random access response from the plurality of random access responses; transmitting, by the first wireless communication device to a second wireless communication device, the first random access response including the indication; and transmitting, by the first wireless communication device to the second wireless communication device, the second random access response after the first random access response.

The method may also include providing, by the first wireless communication device, a downlink grant for the second random access response in the first random access response. The method may also include wherein the indication in the random access response further comprises a plurality of identifiers to be included in the second random access response.

Further embodiments of the present disclosure include an apparatus including a transceiver configured to receive, from a wireless communication device, a plurality of transmit opportunities in a shared channel; and a processor configured to determine a designated time from among the plurality of transmit opportunities; and trigger a timer in response to reaching the determined designated time regardless of whether a random access message has been successfully transmitted during one of the plurality of transmit opportunities.

The apparatus may also include where the processor is further configured to restart a random access procedure in response to the timer expiring before the apparatus receives an instruction from the wireless communication device during a period of the timer. The apparatus may also include wherein the instruction comprises a response to the random access message. The apparatus may also include wherein the instruction comprises a physical downlink control channel (PDCCH) message instructing the apparatus to retransmit the random access message. The apparatus may also include wherein the designated time comprises a first transmit opportunity from among the plurality of transmit opportunities. The apparatus may also include wherein the designated time comprises a last transmit opportunity from among the plurality of transmit opportunities. The apparatus may also include wherein the designated time comprises a transmit opportunity after a first transmit opportunity, but before a last transmit opportunity, from among the plurality of transmit opportunities. The apparatus may also include wherein the random access message is part of a four-step random access procedure. The apparatus may also include wherein the random access message is part of a two-step random access procedure.

Further embodiments of the present disclosure include an apparatus including a transceiver configured to receive, from a wireless communication device during a two-step random access procedure, a random access response in a shared channel during a random access window; and a processor configured to determine, in response to the random access response not including an identifier of the apparatus, whether the random access response includes an indication of a subsequent random access response pending from the wireless communication device during the random access window; and monitor for the subsequent random access response from the wireless communication device in the shared channel in response to determining that the random access response includes the indication during the random access window.

The apparatus may also include the processor being further configured to stop monitoring of the shared channel in response to determining that the random access response does not include the indication during the random access window. The apparatus may also include the processor being further configured to restart the two-step random access procedure in response to the random access response not including the indication and an identifier associated with the apparatus. The apparatus may further include the processor being further configured to obtain a downlink grant for the subsequent random access response from the random access response. The apparatus may further include wherein the indication in the random access response further comprises a plurality of identifiers to be included in the subsequent random access response, the processor being further configured to check the indication for an identifier associated with the apparatus from among the plurality of communication device identifiers. The apparatus may further include the processor being further configured to stop monitoring of the shared channel in response to the plurality of communication device identifiers not including the identifier associated with the apparatus.

Further embodiments of the present disclosure include an apparatus including a transceiver configured to transmit, to a wireless communication device, a plurality of transmit opportunities in a shared channel; and a processor configured to determine a designated time from among the plurality of transmit opportunities; and trigger a timer in response reaching the determined designated time regardless of whether a random access message has been successfully transmitted during one of the plurality of transmit opportunities.

The apparatus may further include wherein the transceiver is further configured to receive a message from the wireless communication device; and transmit, to the wireless communication device, a retransmission request in response to an inability to decode the message, the retransmission request comprises a new plurality of transmit opportunities. The apparatus may further include wherein the processor is further configured to restart the timer in response to transmitting the retransmission request and reaching the determined designated time after transmitting the retransmission request, regardless of whether a resent random access message has been successfully transmitted during one of the new plurality of transmit opportunities. The apparatus may further include wherein the designated time comprises a first transmit opportunity from among the plurality of transmit opportunities. The apparatus may further include wherein the designated time comprises a last transmit opportunity from among the plurality of transmit opportunities. The apparatus may further include wherein the designated time comprises a transmit opportunity after a first transmit opportunity, but before a last transmit opportunity, from among the plurality of transmit opportunities. The apparatus may further include wherein the random access message is part of a four-step random access procedure. The apparatus may further include wherein the random access message is part of a two-step random access procedure.

Further embodiments of the present disclosure include an apparatus including a processor configured to determine whether to transmit a plurality of random access responses during a two-step random access procedure in a shared channel during a random access window; and include, in response to determining to transmit a plurality of random access responses, into a first random access response from the plurality of random access responses an indication of a second random access response from the plurality of random access responses; and a transceiver configured to: transmit, to a second wireless communication device, the first random access response including the indication; and transmit, to the second wireless communication device, the second random access response after the first random access response.

The apparatus may further include wherein the processor is further configured to provide a downlink grant for the second random access response in the first random access response. The apparatus may further include wherein the indication in the random access response further comprises a plurality of identifiers to be included in the second random access response.

Further embodiments of the present disclosure include a non-transitory computer-readable medium having program code recorded thereon, the program code including code for causing a first wireless communication device to receive, from a second wireless communication device, a plurality of transmit opportunities in a shared channel; code for causing the first wireless communication device to determine a designated time from among the plurality of transmit opportunities; and code for causing the first wireless communication device to trigger a timer in response reaching the determined designated time regardless of whether a random access message has been successfully transmitted during one of the plurality of transmit opportunities.

The non-transitory computer-readable medium may also include code for causing the first wireless communication device to restart a random access procedure in response to the timer expiring before the first wireless communication device receives an instruction from the second wireless communication device during a period of the timer. The non-transitory computer-readable medium may also include wherein the instruction comprises a response to the random access message. The non-transitory computer-readable medium may also include wherein the instruction comprises a physical downlink control channel (PDCCH) message instructing the first wireless communication device to retransmit the random access message. The non-transitory computer-readable medium may also include wherein the designated time comprises a first transmit opportunity from among the plurality of transmit opportunities. The non-transitory computer-readable medium may also include wherein the designated time comprises a last transmit opportunity from among the plurality of transmit opportunities. The non-transitory computer-readable medium may also include wherein the designated time comprises a transmit opportunity after a first transmit opportunity, but before a last transmit opportunity, from among the plurality of transmit opportunities. The non-transitory computer-readable medium may also include wherein the random access message is part of a four-step random access procedure. The non-transitory computer-readable medium may also include wherein the random access message is part of a two-step random access procedure.

Further embodiments of the present disclosure include a non-transitory computer-readable medium having program code recorded thereon, the program code including code for causing a first wireless communication device to receive, from a second wireless communication device during a two-step random access procedure, a random access response in a shared channel during a random access window; code for causing the first wireless communication device to determine, in response to the random access response not including an identifier of the first wireless communication device, whether the random access response includes an indication of a subsequent random access response pending from the second wireless communication device during the random access window; and code for causing the first wireless communication device to monitor for the subsequent random access response from the second wireless communication device in the shared channel in response to determining that the random access response includes the indication during the random access window.

The non-transitory computer-readable medium may also include code for causing the first wireless communication device to stop monitoring of the shared channel in response to determining that the random access response does not include the indication during the random access window. The non-transitory computer-readable medium may also include code for causing the first wireless communication device to restart the two-step random access procedure in response to the random access response not including the indication and an identifier associated with the first wireless communication device. The non-transitory computer-readable medium may also include code for causing the first wireless communication device to obtain a downlink grant for the subsequent random access response from the random access response. The non-transitory computer-readable medium may also include wherein the indication in the random access response further comprises a plurality of identifiers to be included in the subsequent random access response, further comprising: code for causing the first wireless communication device to check the indication for an identifier associated with the first wireless communication device from among the plurality of communication device identifiers. The non-transitory computer-readable medium may also include code for causing the first wireless communication device to stop monitoring of the shared channel in response to the plurality of communication device identifiers not including the identifier associated with the first wireless communication device.

Further embodiments of the present disclosure include a non-transitory computer-readable medium having program code recorded thereon, the program code including code for causing a first wireless communication device to transmit, to a second wireless communication device, a plurality of transmit opportunities in a shared channel; code for causing the first wireless communication device to determine a designated time from among the plurality of transmit opportunities; and code for causing the first wireless communication device to trigger a timer in response reaching the determined designated time regardless of whether a random access message has been successfully transmitted during one of the plurality of transmit opportunities.

The non-transitory computer-readable medium may also include code for causing the first wireless communication device to receive a message from the second wireless communication device; and code for causing the first wireless communication device to transmit, to the second wireless communication device, a retransmission request in response to an inability to decode the message, the retransmission request comprises a new plurality of transmit opportunities. The non-transitory computer-readable medium may also include code for causing the first wireless communication device to restart the timer in response to the transmitting the retransmission request and reaching the determined designated time after transmitting the retransmission request, regardless of whether a resent random access message has been successfully transmitted during one of the new plurality of transmit opportunities. The non-transitory computer-readable medium may also include wherein the designated time comprises a first transmit opportunity from among the plurality of transmit opportunities. The non-transitory computer-readable medium may also include wherein the designated time comprises a last transmit opportunity from among the plurality of transmit opportunities. The non-transitory computer-readable medium may also include wherein the designated time comprises a transmit opportunity after a first transmit opportunity, but before a last transmit opportunity, from among the plurality of transmit opportunities. The non-transitory computer-readable medium may also include wherein the random access message is part of a four-step random access procedure. The non-transitory computer-readable medium may also include wherein the random access message is part of a two-step random access procedure.

Further embodiments of the present disclosure include a non-transitory computer-readable medium having program code recorded thereon, the program code including code for causing a first wireless communication device to determine whether to transmit a plurality of random access responses during a two-step random access procedure in a shared channel during a random access window; code for causing the first wireless communication device to include, in response to determining to transmit a plurality of random access responses, into a first random access response from the plurality of random access responses an indication of a second random access response from the plurality of random access responses; code for causing the first wireless communication device to transmit, to a second wireless communication device, the first random access response including the indication; and code for causing the first wireless communication device to transmit, to the second wireless communication device, the second random access response after the first random access response.

The non-transitory computer-readable medium may also include code for causing the first wireless communication device to provide a downlink grant for the second random access response in the first random access response. The non-transitory computer-readable medium may also include wherein the indication in the random access response further comprises a plurality of identifiers to be included in the second random access response.

Further embodiments of the present disclosure include an apparatus including means for receiving, from a wireless communication device, a plurality of transmit opportunities in a shared channel; means for determining a designated time from among the plurality of transmit opportunities; and means for triggering a timer in response reaching the determined designated time regardless of whether a random access message has been successfully transmitted during one of the plurality of transmit opportunities.

The apparatus may also include means for restarting a random access procedure in response to the timer expiring before the apparatus receives an instruction from the wireless communication device during a period of the timer. The apparatus may also include wherein the instruction comprises a response to the random access message. The apparatus may also include wherein the instruction comprises a physical downlink control channel (PDCCH) message instructing the apparatus to retransmit the random access message. The apparatus may also include wherein the designated time comprises a first transmit opportunity from among the plurality of transmit opportunities. The apparatus may also include wherein the designated time comprises a last transmit opportunity from among the plurality of transmit opportunities. The apparatus may also include wherein the designated time comprises a transmit opportunity after a first transmit opportunity, but before a last transmit opportunity, from among the plurality of transmit opportunities. The apparatus may also include wherein the random access message is part of a four-step random access procedure. The apparatus may also include wherein the random access message is part of a two-step random access procedure.

Further embodiments of the present disclosure include an apparatus including means for receiving, from a wireless communication device during a two-step random access procedure, a random access response in a shared channel during a random access window; means for determining, in response to the random access response not including an identifier of the apparatus, whether the random access response includes an indication of a subsequent random access response pending from the wireless communication device during the random access window; and means for monitoring for the subsequent random access response from the wireless communication device in the shared channel in response to determining that the random access response includes the indication during the random access window.

The apparatus may also include means for stopping monitoring of the shared channel in response to determining that the random access response does not include the indication during the random access window. The apparatus may also include means for restarting the two-step random access procedure in response to the random access response not including the indication and an identifier associated with the apparatus. The apparatus may also include means for obtaining a downlink grant for the subsequent random access response from the random access response. The apparatus may also include wherein the indication in the random access response further comprises a plurality of identifiers to be included in the subsequent random access response, the apparatus further comprising: means for checking the indication for an identifier associated with the apparatus from among the plurality of communication device identifiers. The apparatus may also include means for stopping monitoring of the shared channel in response to the plurality of communication device identifiers not including the identifier associated with the apparatus.

Further embodiments of the present disclosure include an apparatus including means for transmitting, to a wireless communication device, a plurality of transmit opportunities in a shared channel; means for determining a designated time from among the plurality of transmit opportunities; and means for triggering a timer in response reaching the determined designated time regardless of whether a random access message has been successfully transmitted during one of the plurality of transmit opportunities.

The apparatus may also include means for receiving a message from the wireless communication device; and means for transmitting, to the wireless communication device, a retransmission request in response to an inability to decode the message, the retransmission request comprises a new plurality of transmit opportunities. The apparatus may also include means for restarting the timer in response to the transmitting the retransmission request and reaching the determined designated time after transmitting the retransmission request, regardless of whether a resent random access message has been successfully transmitted during one of the new plurality of transmit opportunities. The apparatus may also include wherein the designated time comprises a first transmit opportunity from among the plurality of transmit opportunities. The apparatus may also include wherein the designated time comprises a last transmit opportunity from among the plurality of transmit opportunities. The apparatus may also include wherein the designated time comprises a transmit opportunity after a first transmit opportunity, but before a last transmit opportunity, from among the plurality of transmit opportunities. The apparatus may also include wherein the random access message is part of a four-step random access procedure. The apparatus may also include wherein the random access message is part of a two-step random access procedure.

Further embodiments of the present disclosure include an apparatus including means for determining whether to transmit a plurality of random access responses during a two-step random access procedure in a shared channel during a random access window; means for including, in response to determining to transmit a plurality of random access responses, into a first random access response from the plurality of random access responses an indication of a second random access response from the plurality of random access responses; means for transmitting, to a wireless communication device, the first random access response including the indication; and means for transmitting, to the wireless communication device, the second random access response after the first random access response.

The apparatus may also include means for providing a downlink grant for the second random access response in the first random access response. The apparatus may also include wherein the indication in the random access response further comprises a plurality of identifiers to be included in the second random access response.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication comprising:
receiving, by a first wireless communication device from a second wireless communication device, a plurality of transmit opportunities in a shared channel;
determining, by the first wireless communication device, whether the shared channel is in use prior to a transmit opportunity from among the plurality of transmit opportunities; and
triggering, by the first wireless communication device, a timer in response to
failing to transmit the random access message during any of the plurality of transmit opportunities.

2. The method of claim 1, further comprising:
restarting, by the first wireless communication device, a random access procedure in response to the timer expiring before the first wireless communication device receives an instruction from the second wireless communication device during a period of the timer.

3. The method of claim 2, wherein the instruction comprises a response to the random access message.

4. The method of claim 2, wherein the instruction comprises a physical downlink control channel (PDCCH) message instructing the first wireless communication device to retransmit the random access message.

5. The method of claim 1, wherein the random access message is part of a two-step random access procedure.

6. The method of claim 5, further comprising:
receiving, by the first wireless communication device from the second wireless communication device, a random access response in the shared channel during a random access window;
determining, by the first wireless communication device in response to the random access response not including an identifier of the first wireless communication device, whether the random access response includes an indication of a subsequent random access response pending from the second wireless communication device during the random access window; and
monitoring, by the first wireless communication device, for the subsequent random access response from the second wireless communication device in the shared channel in response to determining that the random access response includes the indication during the random access window.

7. The method of claim 6, further comprising:
stopping, by the first wireless communication device, monitoring of the shared channel in response to determining that the random access response does not include the indication during the random access window.

8. The method of claim 6, wherein the determining further comprises:
obtaining, by the first wireless communication device, a downlink grant for the subsequent random access response from the random access response.

9. An apparatus comprising:
a transceiver configured to receive, from a wireless communication device, a plurality of transmit opportunities in a shared channel; and
a processor configured to:
determine whether the shared channel is in use prior to a transmit opportunity from among the plurality of transmit opportunities;
trigger a timer in response to transmitting a random access message during the transmit opportunity, and
trigger the timer in response to failing to transmit the random access message during any of the plurality of transmit opportunities.

10. The apparatus of claim 9, wherein the processor is further configured to:
restart a random access procedure in response to the timer expiring before the apparatus receives an instruction from the wireless communication device during a period of the timer.

11. The apparatus of claim 10, wherein the instruction comprises a response to the random access message.

12. The apparatus of claim 10, wherein the instruction comprises a physical downlink control channel (PDCCH) message instructing the apparatus to retransmit the random access message.

13. The apparatus of claim 9, wherein the random access message is part of a two-step random access procedure.

14. The apparatus of claim 13, wherein:
the transceiver is further configured to receive, from the wireless communication device, a random access response in the shared channel during a random access window; and
the processor is further configured to:
determine, in response to the random access response not including an identifier of the apparatus, whether the random access response includes an indication of a subsequent random access response pending from the wireless communication device during the random access window; and
monitor for the subsequent random access response from the wireless communication device in the shared channel in response to determining that the random access response includes the indication during the random access window.

15. The apparatus of claim 14, wherein the processor is further configured to:
stop monitoring of the shared channel in response to determining that the random access response does not include the indication during the random access window.

16. The apparatus of claim 14, wherein the processor is further configured to:
obtain a downlink grant for the subsequent random access response from the random access response.

17. A non-transitory computer-readable medium having program code recorded thereon, the program code comprising:
code for causing a first wireless communication device to receive, from a second wireless communication device, a plurality of transmit opportunities in a shared channel;
code for causing the first wireless communication device to determine whether the shared channel is in use prior to a transmit opportunity from among the plurality of transmit opportunities; and
code for causing the first wireless communication device to trigger a timer in response to failing to transmit the random access message during any of the plurality of transmit opportunities.

18. The non-transitory computer-readable medium of claim 17, further comprising:
code for causing the first wireless communication device to restart a random access procedure in response to the timer expiring before the first wireless communication device receives an instruction from the second wireless communication device during a period of the timer.

19. The non-transitory computer-readable medium of claim 18, wherein the instruction comprises a response to the random access message.

20. The non-transitory computer-readable medium of claim 18, wherein the instruction comprises a physical downlink control channel (PDCCH) message instructing the first wireless communication device to retransmit the random access message.

21. The non-transitory computer-readable medium of claim 17, wherein the random access message is part of a two-step random access procedure.

22. The non-transitory computer-readable medium of claim 21, further comprising:
code for causing the first wireless communication device to receive, from the second wireless communication device, a random access response in the shared channel during a random access window;
code for causing the first wireless communication device to determine, in response to the random access response not including an identifier of the first wireless communication device, whether the random access response includes an indication of a subsequent random access response pending from the second wireless communication device during the random access window; and
code for causing the first wireless communication device to monitor for the subsequent random access response from the second wireless communication device in the shared channel in response to determining that the random access response includes the indication during the random access window.

23. The non-transitory computer-readable medium of claim 22, further comprising:
code for causing the first wireless communication device to stop monitoring of the shared channel in response to determining that the random access response does not include the indication during the random access window.

24. An apparatus comprising:
means receiving, from a wireless communication device, a plurality of transmit opportunities in a shared channel;
means for determining whether the shared channel is in use prior to a transmit opportunity from among the plurality of transmit opportunities; and
means for triggering a timer in response to
failing to transmit the random access message during any of the plurality of transmit opportunities.

25. The apparatus of claim 24, further comprising:
means for restarting a random access procedure in response to the timer expiring before the apparatus receives an instruction from the wireless communication device during a period of the timer.

26. The apparatus of claim 25, wherein the instruction comprises a response to the random access message.

27. The apparatus of claim 25, wherein the instruction comprises a physical downlink control channel (PDCCH) message instructing the apparatus to retransmit the random access message.

28. The apparatus of claim 24, wherein the random access message is part of a two-step random access procedure.

29. The apparatus of claim 28, further comprising:
means for receiving, from the wireless communication device, a random access response in the shared channel during a random access window;
means for determining, in response to the random access response not including an identifier of the apparatus, whether the random access response includes an indication of a subsequent random access response pending from the wireless communication device during the random access window; and
means for monitoring for the subsequent random access response from the wireless communication device in the shared channel in response to determining that the random access response includes the indication during the random access window.

30. The apparatus of claim 29, further comprising:
means for stopping monitoring of the shared channel in response to determining that the random access response does not include the indication during the random access window.

* * * * *